United States Patent
Mahanthappa et al.

(10) Patent No.: US 9,688,789 B2
(45) Date of Patent: Jun. 27, 2017

(54) DEGRADABLE POLYCATIONS DERIVED FROM AMINO ACID VINYL ESTERS

(71) Applicant: Wisconsin Alumni Research Foundation, Madison, WI (US)

(72) Inventors: Mahesh Kalyana Mahanthappa, Madison, WI (US); Glen Bradley Thomas, Madison, WI (US); Corinne Elizabeth Lipscomb, St. Paul, MN (US)

(73) Assignee: NATIONAL SCIENCE FOUNDATION, Arlington, VA (US)

( * ) Notice: Subject to any disclaimer, the term of this patent is extended or adjusted under 35 U.S.C. 154(b) by 232 days.

(21) Appl. No.: 14/305,039

(22) Filed: Jun. 16, 2014

(65) Prior Publication Data

US 2014/0296462 A1  Oct. 2, 2014

Related U.S. Application Data

(63) Continuation of application No. 13/738,303, filed on Jan. 10, 2013, now Pat. No. 8,796,405.
(Continued)

(51) Int. Cl.

| C08F 26/06 | (2006.01) |
| C08F 26/02 | (2006.01) |
| C08F 22/26 | (2006.01) |
| C08F 226/06 | (2006.01) |
| C08F 226/02 | (2006.01) |
| C08F 216/14 | (2006.01) |
| C08F 218/08 | (2006.01) |

(Continued)

(52) U.S. Cl.
CPC .............. *C08F 26/06* (2013.01); *C08F 22/26* (2013.01); *C08F 26/02* (2013.01); *C08F 216/1458* (2013.01); *C08F 218/08* (2013.01); *C08F 226/02* (2013.01); *C08F 226/06* (2013.01); *C08F 18/04* (2013.01); *C08F 18/22* (2013.01); *C08F 218/04* (2013.01); *C08F 218/10* (2013.01)

(58) Field of Classification Search
CPC .......... C08F 26/06; C08F 26/02; C08F 18/04; C08F 18/22; C08F 218/04; C08F 218/10; C08F 226/06; C08F 226/02
See application file for complete search history.

(56) References Cited

U.S. PATENT DOCUMENTS

| 2,733,233 A | 1/1956 | Miegel et al. |
| 2005/0161858 A1* | 7/2005 | Chevillard .......... B29C 47/0014 264/176.1 |
| 2013/0121954 A1 | 5/2013 | Wakefield et al. |

OTHER PUBLICATIONS

Boyer et al.; "Ready Protease-catalyzed Synthesis of Carbohydrate-amino Acid Conjugates"; Chem. Commun., pp. 1908-1909; (2001) with Supplementary Information.
(Continued)

*Primary Examiner* — Ling Choi
*Assistant Examiner* — David L Miller
(74) *Attorney, Agent, or Firm* — Cantor Colburn LLP

(57) ABSTRACT

Described herein are the synthesis and polymerization of a series of N-Boc-protected amino acid vinyl ester (BAAVE) monomers. Homopolymers and heteropolymers containing the monomers are described, particularly heteropolymers with vinyl ester monomers such as vinyl acetate. Deprotection can be used to produce hydrophilic and hydrophobic polymers that are particular useful in biological applications such as cellular delivery of biological materials.

12 Claims, 4 Drawing Sheets

Related U.S. Application Data

(60) Provisional application No. 61/587,958, filed on Jan. 18, 2012.

(51) Int. Cl.
    *C08F 218/04* (2006.01)
    *C08F 18/22* (2006.01)
    *C08F 18/04* (2006.01)
    *C08F 218/10* (2006.01)

(56) References Cited

OTHER PUBLICATIONS

Brossat et al.; "Development of an Acid-Washable Tag for the Separation of Enantiomers from Bioresolutions"; Organic Process Research & Development; 13; pp. 706-709; (2009).
Drew et al.; "Antifertility Activity of N-Protected Glycine Activated Esters"; Journal of Pharmaceutical Sciences; 70(1); pp. 60-63; (1981).
Geckeier and Kurt et al.; "Copolymerization Alkenyl Esters of Amino Acid"; The Macromolecular Chemistry; 175; pp. 1995-2001; (1974) with English Translation.
Geckeler et al.; "Synthesis of Amino Acid Alkenyl Esters"; Chem. Ber. 107; pp. 1271-1274; (1974) with English Abstract.
Hall et al.; "Antifertility and Antiproteolytic Activity of activated N-carbobenzoxy Amino Acid Esters"; Journal of Pharmaceutical Sciences; 68(6); p. 696-698; (2006).
Lobel et al.; "Synthesis of Hydroxycarboxylic Acid Vinyl Esters"; Synthesis; pp. 375-377; (1994).
Loeffler et al.; "Antineoplastic Agents. 1. N-Protected Vinyl, 1,2-Dihaloethyl, and Cyanomethyl Esters of Phenylalanine"; Journal of Mediciinal Chemistry; 20(12); pp. 1578-1584; (1977).
Nguyen et al.; "Amine-Modified Poly(Vinyl Alcohol)s as Non-viral Vectors for siRNA Delivery: Effects of the Degree of Amine Substitution on Physicochemical Properties and Knockdown Efficiency"; Pharm Res; 27; pp. 2670-2682; (2010).
Schmidt et al.; "Rapid Determinaton of Primary amino Groups on Soluble Polymers"; Analytica Chimica Acta; 71; pp. 79-84; (1974).
Shaprio et al.; "Exchange Reaction of Vinyl Acetate with Phthalamino Acids"; Abstract; N. D. Zelinskii Institute of Organic Chemistry, Academy of Sciences, USSR; pp. 2053-2054; (1963).
Shostakovskii and Shapiro et al.; "Synthesis of the Vinyl Ester of Phthalylglycine and Some of its Transformations"; N. D. Zelinskii Institute of Organic Chemistry, Academy of Sciences of the USSR, Translated from Izvestiya Akademii Nauk SSSR, Otdelenie Khimicheskikh Nauk 1961; p. 477-479; (1961).
Unger et al.; "Branched Polyesters Based on Poly[vinyl-3-(dialkylamino)alkylcarbamate-co-vinyl acetate-co-vinyl alcohol]-graft-poly(D,L-lactide-co-glycolide): Effects of Polymer Structure on Cytotoxicity"; Biomaterials; 28; pp. 1610-1619; (2007).
Weinhouse et al.; "A New Methodology for the Preparation of Vinyl Esters"; Synthesis; p. 81-83; (1993).
Wittmar et al.; "Biophysical and Transfection Studies of an Amine-Modified Poly(vinyl alcohol) for Gene Delivery"; Bioconjugate Chem.; 16; pp. 1390-1398; (2005).
Dehshahri et al.; "Gene Transfer Efficiency of High Primary Amine Content, Hydrophobic, Alkyl-oligoamine Derivatives of Polyethylenimine"; Biomaterials; 30; pp. 4187-4194; (2009).
Kermagoret et al.; "One-pot Controlled Synthesis of Double Thermoresponsive N-vinylcaprolactam-based Copolymers with Tunable LCSTst"; Polymer Chemistry; 4; pp. 2575-2583; (2013).
Lau et al.; "Thermally Sensitive and Biocompatible Poly(N-vinylcaprolactam): Synthesis and Characterization of High Molar Mass Linear Chains"; Macromolecules; 32; pp. 581-584; (1999).
Pack et al; "Design and Development of Polymers for Gene Delivery"; Nature Reviews: Drug Discovery: 4; pp. 581-593 (2005).
Pathak et al.; "Recent Trends in Non-viral Vector-mediated Gene Delivery"; Biotechnol. J. 4; pp. 1559-1572; (2009).
Sprouse et al.; "Investigating the Effects of Block versus Statistical Glycopolycations Containing Primary and Tertiary Amines for Plasmid DNA Delivery"; Biomacromolecules; 15; pp. 2616-2628; (2014).
Thomas et al.; "Enhancing Polyethylenimine's Delivery of Plasmid DNA into Mammalian Cells"; PNAS; 99(23); pp. 14640-14645; (2002).

\* cited by examiner

DEGRADABLE POLYCATIONS DERIVED FROM AMINO ACID VINYL ESTERS

CROSS-REFERENCE TO RELATED APPLICATIONS

This application is a continuation of U.S. application Ser. No. 13/738,303 filed on Jan. 10, 2013, which claims priority to U.S. Provisional Application 61/587,958 filed on Jan. 18, 2012, which is incorporated herein by reference in its entirety.

STATEMENT REGARDING FEDERALLY SPONSORED RESEARCH & DEVELOPMENT

This invention was made with government support under 0748503 awarded by the National Science Foundation. The government has certain rights in the invention.

FIELD OF THE DISCLOSURE

The present disclosure is related to degradable polycationic materials for biological applications such as cellular delivery of biological materials.

BACKGROUND

Degradable polyelectrolytes are useful materials in a variety of biological applications ranging from biomedical implant coatings and immunostimulants to vehicles for drug and nucleic acid delivery. A significant fraction of these applications rely on polyelectrolytes that perform a specific function, after which they degrade into non-toxic byproducts, thereby preventing bioaccumulation and toxicity. Many known degradable polyelectrolytes contain hydrolytically unstable functionalities in the polymer backbone, including ester, anhydride, acetal, carbonate, amide, phosphate, and siloxy ether functionalities. While natural polyelectrolytes such as collagen and chitosan have garnered substantial interest in various biological applications, new approaches to degradable synthetic polyelectrolytes will continue to furnish well-defined materials with tunable structures, controlled molecular weights, and variable backbone charge densities and hydrophilicities.

Some of the most widely studied synthetic degradable polyelectrolytes are based on polyphosphazene and poly(β-amino ester) scaffolds. Anionic and cationic derivatives of poly(phosphazene) are promising vaccine adjuvants and nucleic acid delivery agents, respectively; however, complex monomer syntheses and harsh polymerization conditions limit the types of chemical functionality that may be introduced into these materials. Synthesized by the Michael addition polymerization of diamines with diacrylates, poly(beta-amino esters) comprise a modular platform of polycationic materials exhibiting highly variable hydrophilicities and tunable degradabilities depending on the specific monomers used. Various groups have demonstrated the utility of these materials as components in drug delivery vehicles and in erodible polyelectrolyte multilayer films for therapeutic small molecule and nucleic acid delivery. In spite of the demonstrated potential of poly(beta-amino esters), their widespread utility in biomedical applications is curtailed by synthetic difficulties associated with tuning the charge density along the polymer backbone.

What is needed are readily accessible monomer and polymer platforms that provide new materials, particularly for biological applications.

BRIEF SUMMARY

In one aspect, described herein is polymer comprising units of the formula

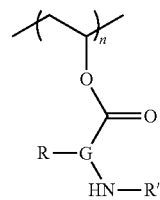

and salts thereof, wherein n is an integer greater than one,

R and R' are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, and G is a group of the formula

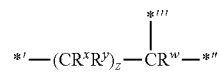

wherein one of *' and *'' indicates a point of attachment to the carbonyl and the other indicates a point of attachment to N, and *''' indicates a point of attachment to R, z is 0, 1, or 2, and $R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

In another aspect, included herein is a polymer comprising units of the formula

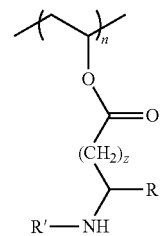

and salts thereof, wherein z is 0, 1, or 2, and

R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, R' is H or R' together with R forms a substituted or unsubstituted $C_2$-$C_{18}$ heterocycloalkyl, or substituted or unsubstituted $C_2$-$C_{18}$ heteroaryl group, each having 5 to 8 ring members.

In another aspect, included herein is a polymer comprising units of the formula

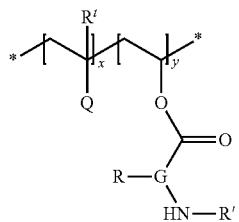

and salts thereof, wherein $R^t$ is H, halo, or methyl,

Q is cyano, halo, nitro, OH, —$CR^a$=$CR^bR^c$, wherein each $R^a$, $R^b$, and $R^c$ are independently H or $C_1$-$C_{18}$ alkyl, —C(O)$NR^dR^e$, wherein each $R^d$ and $R^e$ are independently H or $C_1$-$C_{18}$ alkyl, carbonyl($C_1$-$C_{12}$) alkyl, carbonyloxy($C_1$-$C_{12}$)alkyl, oxycarbonyl($C_1$-$C_{12}$) alkyl, substituted or unsubstituted $C_1$-$C_{12}$ aryl, N-pyrrolidone, N-caprolactam, or a combination comprising at least one of the foregoing groups x+y is an integer greater than two, R and R' are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl; and G is a group of the formula

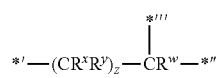

wherein one of *' and *''' indicates a point of attachment to the carbonyl and the other indicates a point of attachment to N, and *'''' indicates a point of attachment to R, z is 0, 1, or 2, and $R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_1$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

In yet another aspect, included herein is a polymer comprising units of the formula

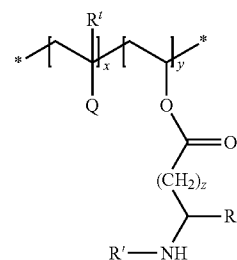

and salts thereof, wherein $R^t$ is H, halo, or methyl,

Q is cyano, halo, nitro, OH, —$CR^a$=$CR^bR^c$, wherein each $R^a$, $R^b$, and $R^c$ are independently H or $C_1$-$C_{18}$ alkyl, —C(O)$NR^dR^e$, wherein each $R^d$ and $R^e$ are independently H or $C_1$-$C_{18}$ alkyl, carbonyl($C_1$-$C_{12}$) alkyl, carbonyloxy($C_1$-$C_{12}$)alkyl, oxycarbonyl($C_1$-$C_{12}$) alkyl, substituted or unsubstituted $C_1$-$C_{12}$ aryl, N-pyrrolidone, N-caprolactam, or a combination comprising at least one of the foregoing groups x+y is an integer greater than two, z is 0, 1, or 2, and R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, R' is H or R' together with R forms a substituted or unsubstituted $C_2$-$C_{18}$ heterocycloalkyl, or substituted or unsubstituted $C_2$-$C_{18}$ heteroaryl group, each having 5 to 8 ring members.

In another aspect, included herein is an N-protected polymer comprising units of the formula

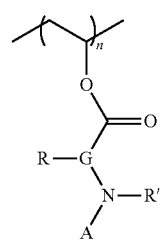

and salts thereof, wherein
n is an integer greater than one,
A is a nitrogen protecting group,
R and R' are each independently a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl; and
G is a group of the formula

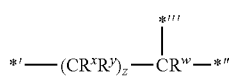

wherein
one of *' and *'' indicates a point of attachment to the carbonyl and the other indicates a point of attachment to N, and *''' indicates a point of attachment to R,
z is 0, 1, or 2, and
$R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

In a further aspect, describes is an N-protected polymer comprising units of the formula

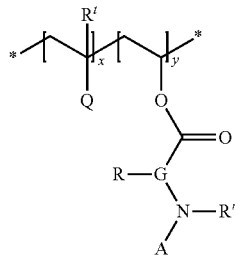

wherein
$R^t$ is H, halo, or methyl,
Q is cyano, halo, nitro, OH, —$CR^a$=$CR^bR^c$, wherein each $R^a$, $R^b$, and $R^c$ are independently H or $C_1$-$C_{18}$ alkyl, —C(O)$NR^dR^e$, wherein each $R^d$ and $R^e$ are independently H or $C_1$-$C_{18}$ alkyl, carbonyl($C_1$-$C_{12}$)alkyl, carbonyloxy($C_1$-$C_{12}$)alkyl, oxycarbonyl($C_1$-$C_{12}$)alkyl, substituted or unsubstituted $C_1$-$C_{12}$ aryl, N-pyrrolidone, N-caprolactam, or a combination comprising at least one of the foregoing groups,
x+y is an integer greater than two,
A is a nitrogen protecting group,
R and R' are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl,
R' is H or together with R forms a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members; and
G is a group of the formula

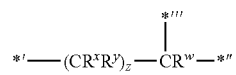

wherein
one of *' and *'' indicates a point of attachment to the carbonyl and the other indicates a point of attachment to N, and *''' indicates a point of attachment to R,
z is 0, 1, or 2, and
$R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

Further described is an N-protected polymer comprising units of formula

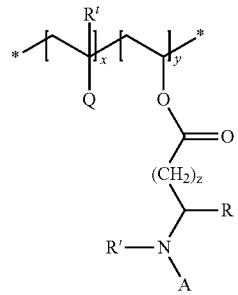

and salts thereof, wherein
$R^t$ is H, halo, or methyl,
Q is cyano, halo, nitro, OH, —$CR^a$=$CR^bR^c$, wherein each $R^a$, $R^b$, and $R^c$ are independently H or $C_1$-$C_{18}$ alkyl, —C(O)$NR^dR^e$, wherein each $R^d$ and $R^e$ are independently H or $C_1$-$C_{18}$ alkyl, carbonyl($C_1$-$C_{12}$)alkyl, carbonyloxy($C_1$-$C_{12}$)alkyl, oxycarbonyl($C_1$-$C_{12}$)alkyl, substituted or unsubstituted $C_1$-$C_{12}$ aryl, N-pyrrolidone, N-caprolactam, or a combination comprising at least one of the foregoing groups,
x+y is an integer greater than two,
z is 0, 1, or 2, A is a nitrogen protecting group, R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, and R' is H or R' together with R forms a substituted or unsubstituted $C_2$-$C_{18}$ heterocycloalkyl, or substituted or unsubstituted $C_2$-$C_{18}$ heteroaryl group, each having 5 to 8 ring members In another aspect, described is an N-protected amino acid O-vinyl ester monomer of the formula

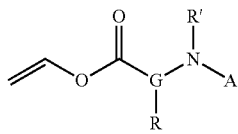

wherein

A is a nitrogen protecting group,

R and R' are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl; and G is a group of the formula

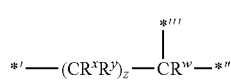

wherein one of *' and *''' indicates a point of attachment to the carbonyl and the other indicates a point of attachment to N, and *'''' indicates a point of attachment to R, z is 0, 1, or 2, and $R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

In a yet further aspect, included is an N-protected amino acid O-vinyl ester monomer of the formula

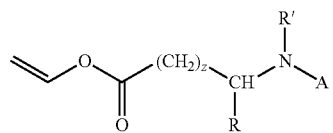

wherein

A is a nitrogen protecting group, z is 0, 1, or 2,

R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, R' is H or together with R forms a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

In a still further aspect, included is a method for synthesizing a polymer comprising units of the formula

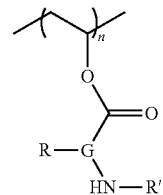

the method comprising reacting an N-protected amino acid of the formula

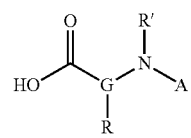

with a vinyl ester of formula the formula

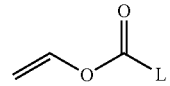

wherein LC(O)O— is a leaving group, in the presence of a Pd-containing catalyst, an oxidizing agent for the Pd-containing catalyst, and a base, for a time and at a temperature sufficient to provide a monomer of the formula

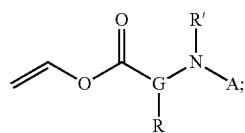

polymerizing the monomer to provide an N-protected polymer comprising units of the formula

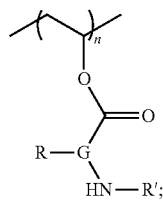

and deprotecting the N-protected polymer to provide the polymer, wherein n, G, R, R', and A are as defined above.

In a further aspect, included herein is a method for synthesizing a polymer of the formula

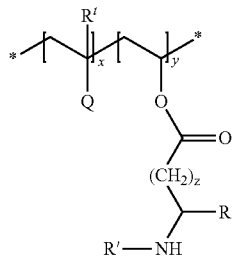

comprising reacting an N-protected amino acid of the formula

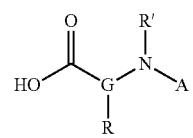

with a vinyl ester of formula the formula

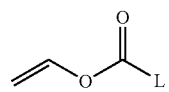

wherein LC(O)O— is a leaving group, in the presence of a Pd-containing catalyst, an oxidizing agent for the Pd-containing catalyst, and a base, for a time and at a temperature sufficient to provide a monomer of the formula

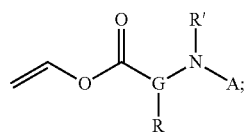

polymerizing the monomer with a comonomer of the formula

to provide an N-protected polymer comprising units of the formula

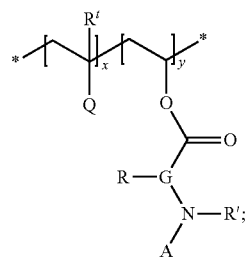

and deprotecting the N-protected polymer to provide the polymer, wherein Q, R$^t$, x, y, G, R, R', and A are as defined above In a still further aspect, included is a method for synthesizing a monomer of the formula

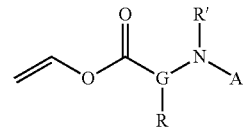

comprising reacting an N-protected amino acid of the formula

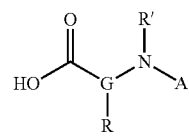

with a vinyl ester of formula the formula

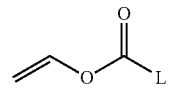

wherein L is a ligand, in the presence of a Pd-containing catalyst, an oxidizing agent for the Pd-containing catalyst, and a base, for a time and at a temperature sufficient to provide a monomer of the formula

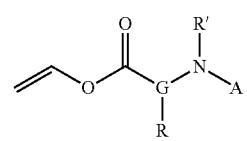

Figure 1:
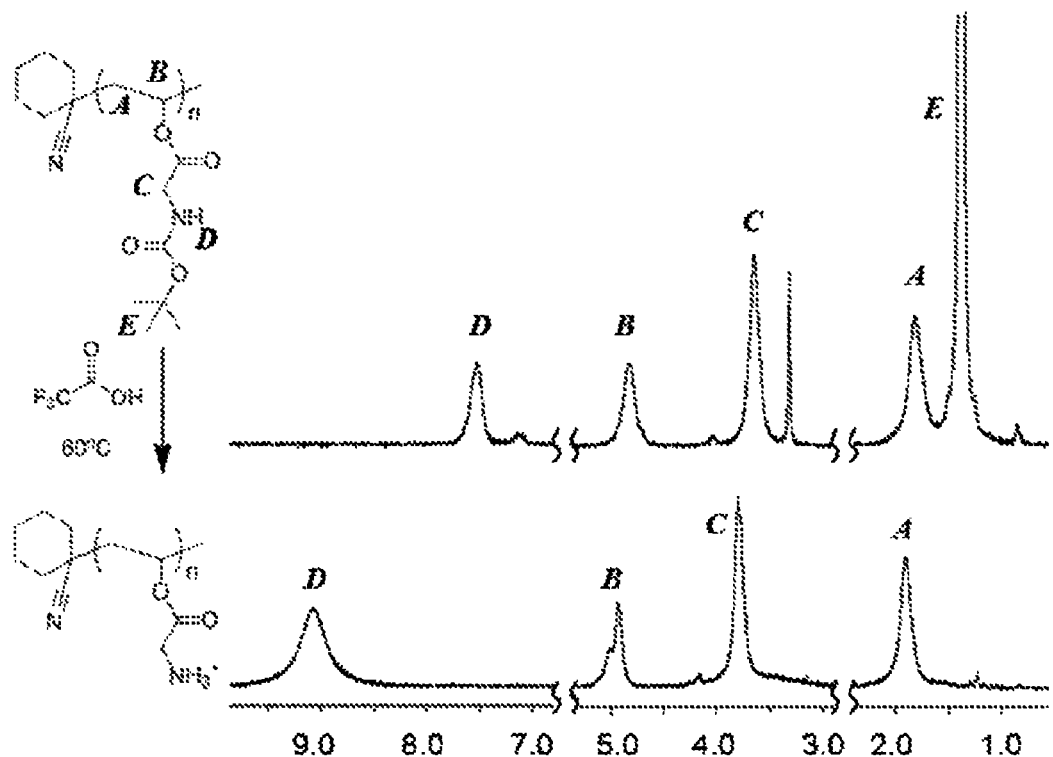
FIG. 1 is $^1$H NMRs of poly(Boc-glycine vinyl ester) and the product of deprotection with $CF_3COOH$. Boc-deprotection of (a) poly(Boc-glycine vinyl ester) (P(BGVE)-1; top) to the cationic (b) poly(vinyl ammonium glycinate trifluoroacetate) (P(VGly.$CF_3COOH$); bottom) using $CF_3COOH$ at 60° C.

The above-described and other features will be appreciated and understood by those skilled in the art from the detailed description, drawings, and appended claims.

DETAILED DESCRIPTION

Described herein is a readily accessible monomer platform for biodegradable, cationically charged polymers that enables chemical control over (1) the charge density along the polymer backbone, (2) the hydrophilicity of the polymer, (3) its degradability and biocompatibility, and (4) its resistance to non-specific protein adsorption in biological media. Poly(vinyl alcohol) (PVA) scaffolds present a little exploited opportunity for the development of new degradable polycations. Previous synthesis methods have produced polymers with a clustered, i.e., non-random, distribution of positively charged functionalities in the polymer backbone. The inventors of the present application recognized that the potential utility and biological tolerance of these PVA-based materials could be further enhanced by the incorporation of variably hydrophilic and hydrophobic cationic functionalities that degrade into cellular nutrients, specifically PVA-based materials and polymers functionalized with esters of amino acids. Another advantage of the polymers described herein is that truly random copolymers that are distinct from previous PVA-based materials with clustered cationic functionalities can be produced.

The polymers are manufactured by polymerization of an N-protected amino acid O-vinyl ester monomer of formula I

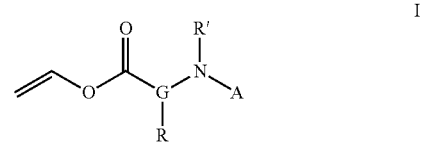

wherein A is a nitrogen protecting group, that is, a group that is stable during polymerization and removable after polymerization (or other post-polymerization reactions) are complete to provide an amino (—NHR') group. A wide variety of protecting groups for amines, and in particular amino acids and amino acid analogs, are known. Examples of the protecting group for the nitrogen, A, includes carbamate protecting groups such as tert-butoxycarbonyl (Boc), benzyloxycarbonyl (CBz), methoxycarbonyl, ethoxycarbonyl, allyloxycarbonyl, and isopropoxycarbonyl. A combination of different protecting groups can be used, for example to provide selective protection and deprotection of the amine groups.

Further in formula I, R and R' are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl.

In an embodiment, R and R' are each independently H, a substituted or unsubstituted $C_1$-$C_{12}$ alkyl, a substituted or unsubstituted $C_3$-$C_{12}$ cycloalkyl having 3 to 8 ring members, a substituted or unsubstituted $C_6$-$C_{18}$ aryl, a substituted or unsubstituted $C_1$-$C_{12}$ haloalkyl, a substituted or unsubstituted $C_2$-$C_{12}$ heterocycloalkyl having 3 to 8 ring members, a substituted or unsubstituted $C_7$-$C_{12}$ arylalkylene, or a substituted or unsubstituted $C_3$-$C_{12}$ heteroaryl having 3 to 8 ring members.

In still another embodiment, R and R' are each independently H, a substituted or unsubstituted $C_1$-$C_8$ alkyl, a substituted or unsubstituted $C_5$-$C_{10}$ cycloalkyl having 5 to 6 ring members, a substituted or unsubstituted $C_6$-$C_{12}$ aryl having 1 ring, a substituted or unsubstituted $C_1$-$C_8$ haloalkyl, a substituted or unsubstituted $C_2$-$C_6$ heterocycloalkyl having 5 to 6 ring members, a substituted or unsubstituted $C_7$-$C_{10}$ arylalkylene, or a substituted or unsubstituted $C_3$-$C_{12}$ heteroaryl having 3 to 8 ring members.

In a still further embodiment, R and R' are each independently H, a $C_1$-$C_8$ alkyl optionally substituted with a $C_1$-$C_6$ haloalkyl, phenyl, hydroxyl, alkoxy, thio, or alkylthio group, a $C_5$-$C_{12}$ cycloalkyl having 5 to 6 ring members optionally substituted with a $C_1$-$C_6$ haloalkyl, hydroxyl, alkoxy, thio, or alkylthio group, a $C_1$-$C_8$ haloalkyl, a $C_6$-$C_{12}$ aryl having 1 ring, a $C_7$-$C_{10}$ arylalkylene optionally substituted with a $C_1$-$C_6$ haloalkyl, phenyl, hydroxyl, alkoxy, thio, or alkylthio group, a $C_2$-$C_6$ heterocycloalkyl having 1 to 2 sulfur atoms, nitrogen atoms, or a combination thereof and 5 to 6 ring members, or a $C_3$-$C_{12}$ heteroaryl having 1 to 2 sulfur atoms, nitrogen atoms, or a combination thereof, 1 to 2 rings, and 5 to 6 ring members.

In an embodiment, R' is a substituted or unsubstituted $C_3$-$C_{18}$ heteroaryl, or R' with R forms a substituted or unsubstituted $C_2$-$C_{18}$ heterocycloalkyl, or substituted or unsubstituted $C_2$-$C_{18}$ heteroaryl group, each having 5 to 8 ring members.

Further in formula I, G is a trivalent group of the formula Ib

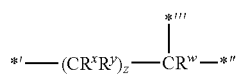

Ib wherein one of *' and *''' indicates a point of attachment to the carbonyl and the other indicates a point of attachment to N, and *'''' indicates a point of attachment to R. In an embodiment, *' indicates a point of attachment to the carbonyl and *''' indicates a point of attachment to N.

The value of z in the trivalent group Ib is 0, 1, or 2. When z=0, the amino acid is an alpha-amino acid. When z=1, *' indicates a point of attachment to the carbonyl, and *''' indicates a point of attachment to N the amino acid is a beta-amino acid. When z=2, *' indicates a point of attachment to the carbonyl, and *''' indicates a point of attachment to N, the amino acid is a gamma-amino acid.

In formula Ib, $R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members. In a specific embodiment, two of $R^w$, $R^x$ and $R^y$, specifically $R^x$ and $R^w$, is H.

In an embodiment, $R^w$, $R^x$ and $R^y$ are each independently H, a substituted or unsubstituted $C_1$-$C_6$ alkyl, a substituted or unsubstituted $C_2$-$C_6$ alkenyl, a substituted or unsubstituted $C_2$-$C_6$ alkynyl, a substituted or unsubstituted $C_3$ to $C_6$ cycloalkyl, a substituted or unsubstituted $C_1$-$C_6$ haloalkyl, a substituted or unsubstituted $C_2$-$C_{10}$ heterocycloalkyl, a substituted or unsubstituted $C_6$ to $C_{12}$ aryl having one ring, a substituted or unsubstituted $C_7$ to $C_{13}$ arylalkylene, or a substituted or unsubstituted $C_4$-$C_{12}$ heteroaryl, or any two of R, R', $R^w$, $R^x$, and $R^y$ together form a substituted or unsubstituted $C_5$-$C_{12}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members. As above, in this embodiment, two of $R^w$, $R^x$ and $R^y$, specifically $R^x$ and $R^w$, can be H, *' indicates a point of attachment to G, and *''' indicates a point of attachment to N.

In a still further embodiment, $R^w$, $R^x$ and $R^y$ are each independently H, a $C_1$-$C_6$ alkyl optionally substituted with a haloalkyl, hydroxyl, alkoxy, thio, or alkylthio group, a haloalkyl, a $C_6$-$C_{12}$ aryl having 1 ring optionally substituted with a haloalkyl, hydroxyl, alkoxy, thio, or alkylthio group, a $C_7$ to $C_{13}$ arylalkylene optionally substituted with a haloalkyl, hydroxyl, alkoxy, thio, or alkylthio group, and R' is H or together with R forms a $C_5$-$C_8$ cycloalkyl optionally substituted with a haloalkyl, hydroxyl, alkoxy, thio, or alkylthio group. In this embodiment, two of $R^w$, $R^x$ and $R^y$, specifically R' and $R^w$, can be H, *' indicates a point of attachment to G, and *''' indicates a point of attachment to N.

Thus, when the monomer of formula 1 is derived from an alpha amino acid, z is zero, and $R^w$ is hydrogen. Specific R groups in this embodiment include the side chains of the natural amino acids, specifically H, methyl, ethyl, propyl, isopropyl, butyl, isobutyl, sec-butyl, methylthiomethylene, benzyl, and indolylmethylene, or R and R' together form propylene to provide a monomer having a 5-membered ring. The side chains of asparagine, cysteine, glutamine, serine, threonine, tyrosine, aspartate, glutamate, arginine, histidine, and lysine can be used provided that the hydroxyl, thio, carboxy, or nitrogen-containing groups in the side chain are sufficiently protected during manufacture of the monomer and polymerization. In other embodiments, z is 1, *' indicates a point of attachment to G, *''' indicates a point of attachment to N, each of $R^w$, $R^x$, and $R^y$ is H, and the R groups include the side chains of natural amino acids. In still another embodiment, z is 2, *' indicates a point of attachment to G, *''' indicates a point of attachment to N, each of $R^w$, $R^x$, and $R^y$ is H, and the R groups include the side chains of natural amino acids.

Specific N-protected amino acid O-vinyl ester monomers are those of formula II

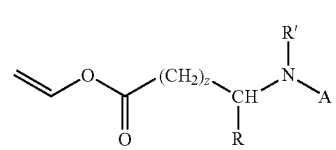

II wherein R, R', z, and A are as defined in formula I. Specific exemplary N-protected amino acid O-vinyl ester monomers of this type include those wherein R is a side chain of a natural amino acid, specifically H, methyl, ethyl, propyl, isopropyl, butyl, isobutyl, sec-butyl, methylthiomethylene, benzyl, and indolylmethylene or R and R' together form propylene to provide a monomer having a 5-membered ring, for example monomers of formulas IIa-IId.

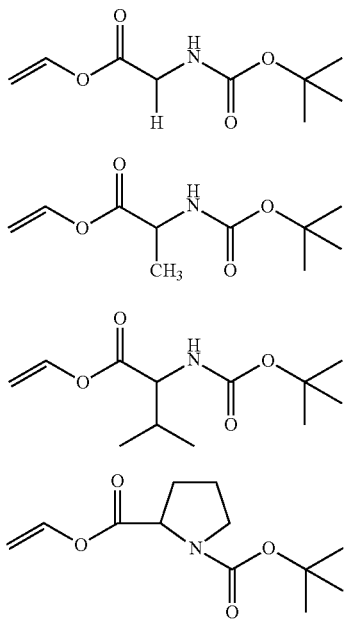

A method for synthesizing the N-protected amino acid O-vinyl ester monomers of formula I comprises reacting an N-protected amino acid of formula III

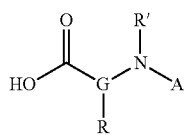

wherein G, R, R' and A are as defined in formula I, with a vinyl ester of formula IV

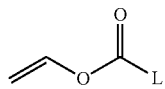

wherein LC(O)O— is a leaving group, in the presence of a Pd-containing catalyst, an oxidizing agent for the Pd-containing catalyst, and a base, for a time and at a temperature sufficient to produce the N-protected amino acid O-vinyl ester monomer I. Leaving groups LC(O)O— are known in the art, wherein L can be, for example, H, a $C_1$-$C_{22}$ alkyl, $C_1$-$C_{22}$ haloalkyl, phenyl, and the like. In an embodiment, L is methyl.

In a specific embodiment, the N-protected amino acid O-vinyl ester monomers of formula II are manufactured by reacting an N-protected amino acid of formula V

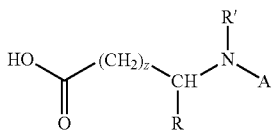

wherein R, R', z, and A are as defined in formula II, with a vinyl ester of formula IV in the presence of a Pd-containing catalyst, an oxidizing agent for the Pd-containing catalyst, and a base, for a time and at a temperature sufficient to produce the N-protected amino acid O-vinyl ester monomer II. In a specific embodiment, the nitrogen-protecting group A is an N-(tert-butoxycarbonyl) (Boc) protecting group.

Exemplary Pd-containing catalysts include $PdCl_2$, $PdBr_2$, $Pd(OOCCH_3)_2$, $Pd(OOCCF_3)_2$, $Pd(OOCC_6H_5)_2$, $Pd(OOCC_4H_9)_2$, $Pd(O_3SCH_3)_2$, $Pd(O_3SCF_3)_2$, $Na_2PdCl_4$, $K_2PdCl_4$, and any combination thereof.

Oxidizing agents for use with the palladium catalysts are known, and include, for example, p-benzoquinone. Additional oxidizing agents for the Pd-containing catalyst include $CuCl_2$, $Cu(OOCH_3)_2$, naphthoquinone, anthraquinone, 2,3-dichloro-5,6-dicyano-p-benzoquinone, and any combination thereof.

Exemplary bases for use in the reaction include alkali metal hydroxides, alkaline earth metal hydroxides, and organic bases such as tri($C_1$-$C_{12}$) alkylamines, KOH, NaOH, $Cs_2CO_3$, $Na_2CO_3$, $K_2CO_3$, $NaHCO_3$, $KHCO_3$, $(CH_3CH_2)_3$N. Combinations of different bases can be used.

In an embodiment, the Pd-containing catalyst is present in an amount of 1 mol %-100 mol %, the oxidizing agent for the Pd-containing catalyst is present in an amount of 1 mol %-100 mol %, and the base is present in an amount of 1 mol %-100 mol %, relative to the amount of the N-protected amino acid.

In a more specific embodiment, the Pd-containing catalyst is present in an amount of 1 mol %-10 mol %, the oxidizing agent for the Pd-containing catalyst is present in an amount of 1 mol %-30 mol %, and the base is present in an amount of 5 mol %-100 mol %, relative to the amount of the N-protected amino acid.

The reaction time and temperature is selected to be effective for the reaction to proceed to the desired degree of completion, and will depend on factors such as the identity of the reactants, pressure, degree of agitation, and like considerations. Effective reaction conditions can be 3 to 40 hours, specifically 30 to 36 hours, at a reaction temperature of 20° C. to 90° C., specifically 22° C. to 60° C., at atmospheric pressure.

As exemplified herein, N-protected amino acid O-vinyl ester (AAVE) monomers were synthesized by Pd-catalyzed transvinylation of N-(tert-butoxycarbonyl) (Boc) protected amino acids with vinyl acetate (VAc). The inventors of the present application found that prior procedures typically produced low yields of the desired monomers (≤30%), likely as a result of decomposition of the active Pd(II) catalysts to inactive Pd(0) black. It was unexpectedly found that the use of an oxidizing agent for the Pd-containing catalyst such as p-benzoquinone can improve yields. Without being held to theory, it is believed that the p-benzoquinone re-oxidizes inactive Pd(0) to catalytically active Pd(II), allowing a substantially improved product yield. In an embodiment, the product yield is greater than 50% based on the amount of the N-(tert-butoxycarbonyl) (Boc) protected amino acid starting material.

Scheme 1 illustrates an embodiment of the method of producing N-protected amino acid O-vinyl ester monomers of formula I wherein G, R, and R' are as defined above and the protecting group A is a Boc group. The Boc amino acid vinyl esters are abbreviated herein as BAAVE. In this scheme, the Pd-containing catalyst is Pd(OAc)$_2$, the oxidizing agent for the Pd-containing catalyst is p-benzoquinone (BQ).

Scheme 1

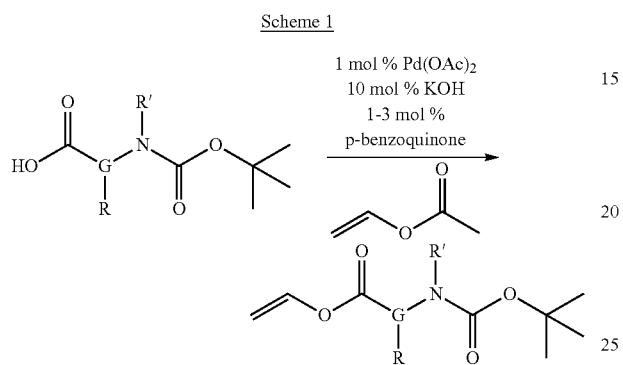

These conditions can also be used to produce monomers of formula II wherein R is defined above and the protecting group A is a Boc group as shown in Scheme 2.

Scheme 2

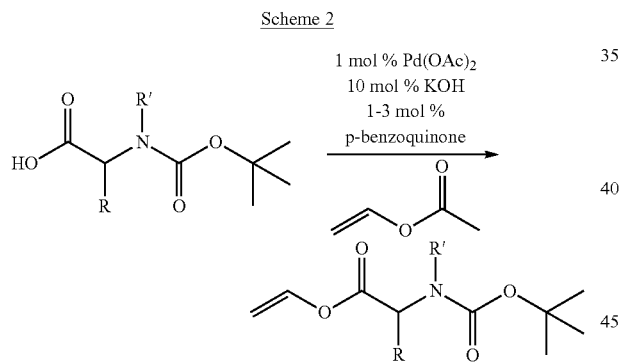

In a specific embodiment of Scheme 2, R is H, CH$_3$, CH(CH$_3$)$_2$ and R' is H, or R and R' together are n-propylene to provide a 5-membered heterocycloalkyl group. As illustrated in Scheme 2, using 1 mol % Pd(OAc)$_2$, 1-3 mol % BQ, and 10 mol % KOH relative to the Boc-protected amino acid, the formation of reduced Pd species was mitigated and monomers Boc-glycine vinyl ester (BGVE), Boc-valine vinyl ester (BVVE), and Boc-alanine vinyl ester (BAVE) were produced in 62-79% isolated yield in one step from commercially available starting materials (Scheme 1a). Due to the poor solubility of Boc-proline in VAc, vinyl pivalate was used as the transvinylation partner at 60° C.

Without being held to theory, it is believed that the polymerization behaviors of these monomers depend on their purities. The purity of the N-protected amino acid O-vinyl ester monomers can optionally be improved by quenching the Pd-catalyzed transvinylation reactions by the addition of a quencher (such as NaBH$_4$(s)), followed by optionally filtering the reaction mixture, for example passing the reaction mixture through a plug of Celite. After an extractive work up, the monomers are optionally purified such as by either distillation under reduced pressure or column chromatography.

Polymers of formula VI and VII are produced by polymerizing one or more of the N-protected amino acid O-vinyl ester monomers of Formula I or II via the vinyl group in the presence of a polymerization initiator, respectively. The number of monomer residues in the polymers, n, depends on reaction conditions, e.g., time, temperature, pressure, the reactivity of the monomer reactants, the initiator used, and the presence of any chain terminating agents. In an embodiment, n is 5 to 400, specifically 20 to 200, and more specifically 45 to 100.

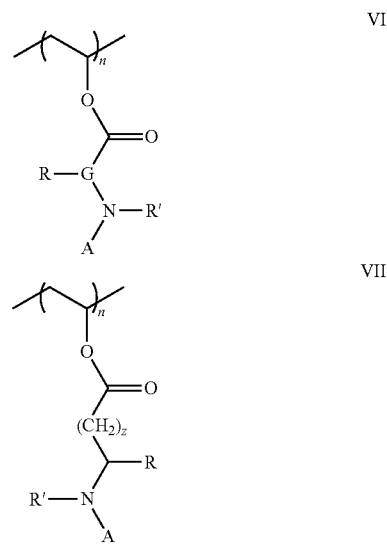

In formulas VI and VII, G, A, R, R', and z are as defined in formulas I and II, respectively, and n is the number of monomer residues in the polymer. The polymers VI and VII can be produced by polymerizing a single N-protected amino acid O-vinyl ester monomer to produce a homopolymer (wherein polymer side chain is the same). In an embodiment, when polymer VI or VII is a homopolymer, R is not hydrogen. Alternatively, two or more N-protected amino acid O-vinyl ester monomers can be copolymerized to produce a copolymer containing two or more different side chains. The monomer residues of the copolymer can be random, block, alternating, or a combination thereof. The polymers can be terminated on an end by an initiator group as described below.

In another embodiment, copolymers are produced by copolymerizing one or more of the N-protected amino acid O-vinyl ester monomers of Formula I or II with another ethylenically unsaturated comonomer of formula VIII

VIII produces copolymers of formulas IX and X, respectively

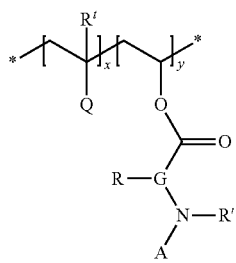

IX

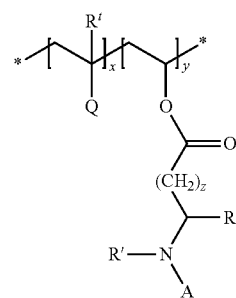

X and salts thereof, wherein G, R$^t$, A, R, R', and z are as defined in formulas I and II, respectively, and x+y is the number of monomer units in the polymer. The copolymers can be terminated on an end by an initiator group as described below. For convenience, the polymers are drawn as the free base, but it should be understood that salts forms are included as well.

Further in formulas VIII, IX, and X, R$^t$ is H, halo, or methyl, and Q is a functional group that facilitates polymerization and/or provides a desired property to the copolymer. Examples of groups Q include cyano, halo, nitro, OH, —CR$^a$=CR$^b$R$^c$, wherein each R$^a$, R$^b$, and R$^c$ are independently H or C$_1$-C$_{18}$ alkyl, amide (—C(O)NR$^d$R$^e$), wherein each R$^d$ and R$^e$ are independently H or C$_1$-C$_{18}$ alkyl, carbonyl(C$_1$-C$_{12}$)alkyl (—C(O)R), carbonyloxy(C$_1$-C$_{12}$)alkyl (—C(O)OR), oxycarbonyl(C$_1$-C$_{12}$)alkyl (—OC(O)R), substituted or unsubstituted C$_1$-C$_{12}$ aryl, N-pyrrolidone, N-caprolactam, and the like. Specific examples of monomers VIII include acrylonitrile, methacrylonitrile, 2-chloroacrylonitrile, and vinyl halides such as vinyl chloride and vinyl fluoride; conjugated dienes such as butadiene; ketones such as methyl vinyl ketone and methyl isopropenyl ketone; vinyl esters such as vinyl acetate, vinyl propionate, vinyl butyrate, vinyl isobutyrate, and other vinyl esters containing up to 18 carbon atoms in the acid moiety; (meth)acrylates such as methyl (meth)acrylate, ethyl (meth)acrylate, propyl (meth)acrylate, butyl (meth)acrylate, isobutyl (meth)acrylate, n-hexyl (meth)acrylate, cyclohexyl (meth)acrylate, decyl (meth)acrylate, dodecyl (meth)acrylate, octadecyl (meth)acrylate, benzyl (meth)acrylate, tetrahydrofurfuryl (meth)acrylate, 2-methoxyethyl (meth)acrylate, methyl chloro(meth)acrylate, ethyleneglycol (meth)acrylate phthalate, 2-hydroxyprop (meth)acrylate, 2-hydroxyethyl (meth)acrylate, substituted or unsubstituted styrenes such as styrene, o-methyl styrene, m-methyl styrene, p-methyl styrene, and alpha-bromostyrene; N-vinylpyrrolidone, and an N-vinyl caprolactam. Two or more different monomers of formula VIII can be used.

The number of monomer units in the polymers, x+y, depends on reaction conditions, e.g., time, temperature, pressure, the reactivity of the monomer reactants, the initiator used, and the presence of any chain terminating agents. In an embodiment, x+y is 5 to 400, specifically 20 to 200, and more specifically 45 to 100. The relative ratio of x:y depends on the molar ratio of monomers I or II to monomer VIII, and the relative reactivity of the monomers. In an embodiment, the molar ratio of x:y is 99:1 to 1:99, specifically 80:20 to 20:80. Similarly, if two or more types of monomers I or II or monomer VIII are used, the relative ratio of each of the monomer residues in the polymer will vary depending on the molar ratio of the monomers and their reactivity. The monomer residues of the copolymer can be random, block, alternating, or a combination thereof.

As stated above, polymerization proceeds by free radical polymerization in the presence of an initiator for a time and at a temperature sufficient to polymerize the monomers. Free radical initiators are known in the art, and can be thermally activated, radiation-activated, or redox initiators. Thermal activation is preferred in some embodiments. Exemplary initiators include, but are not limited to, azobis(isobutyronitrile) (AIBN), LUPEROX™, 2,2'-azobis(4-methoxy-2,4-dimethyl valeronitrile), 1,1'-azobis(cyclohexane-1-carbonitrile) (V-40), 2,2'-azobis(2,4-dimethyl valeronitrile), tert-butyl peroxide, benzoyl peroxide and redox polymerization initiators such as combinations of Fe(III) salts with persulfate salts. In an embodiment, the thermal initiator is 1,1'-azobis(cyclohexane-1-carbonitrile) (V-40).

Reaction conditions are selected to provide the desired degree of polymerization. Reaction conditions will depend on the time, temperature, pressure, amount and type of reactants, amount and type of initiator, and possible side reactions. In an embodiment, the reaction time is 1 to 36 hours, specifically 2 to 6 hours, and the reaction temperature is 20° C. to 150° C., specifically 60° C. to 90° C. The molar ratio of thermal initiator to N-protected amino acid O-vinyl ester monomer can be 10:400, specifically 17:180.

Scheme 3 illustrates an embodiment of the homopolymerization of N-protected amino acid O-vinyl ester monomers wherein G is defined above and the protecting group A is a Boc group.

Scheme 3

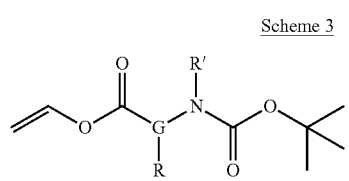
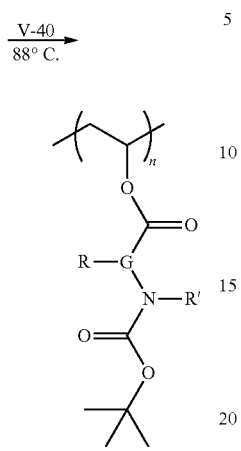

Scheme 4 illustrates another embodiment of the homopolymerization of N-protected amino acid O-vinyl ester mono-

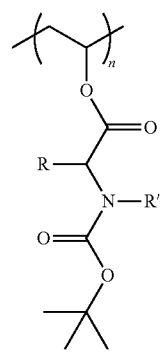

Specific degradable polycations with tailorable charge densities along the polymer backbone can be produced by random copolymerization of a monomer of formula II wherein A is a Boc protecting group (BAAVE monomers) with a vinyl ester monomer such as vinyl acetate (VAc). Scheme 5 illustrates a specific embodiment of a copolymerization reaction of this type

Scheme 5

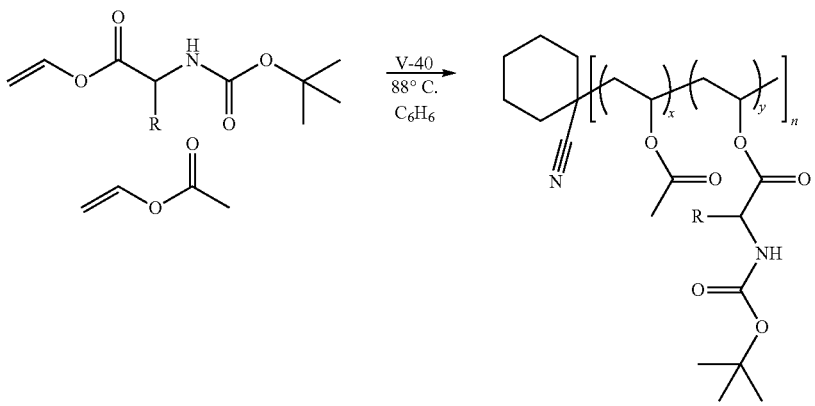

[VAc]:[BAAVE] = 0.11-9.5 mers wherein R and R' are as defined in formula II Initial attempts to homopolymerize BGVE at 60° C. using AIBN initiation furnished only small amounts of polymer even after long reaction times (about 15 hours). In order to increase the monomer propagation rate in these reactions, BAAVE homopolymerizations were conducted at 88° C. using 1,1'-azobis(cyclohexane-1-carbonitrile) (V-40) as the thermal initiator ($t_{1/2}$=10 at 88° C.) as shown in Scheme 4.

wherein R, x, y and n are as defined above.

The polymers and copolymers VI, VII, IX, and X are further reacted to deprotect at least a portion of the protected amine groups adjacent the R groups to produce the poly-amino acid O-vinyl ester polymers (AAVE) XI, XII, XIII, and XIV, respectively

Scheme 4

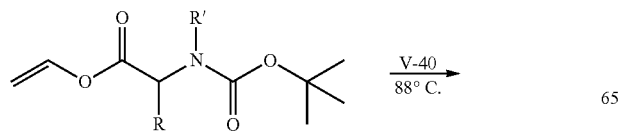

XI

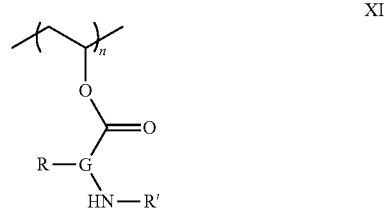

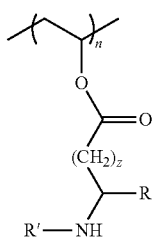

XII

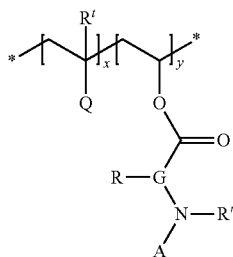

XIII

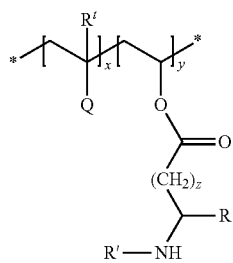

XIV and salts thereof, wherein G, R, R', R', z, n, Q, x, and y are as defined above.

In a specific embodiment of formulas XIII and XIV, R is H, CH$_3$, CH(CH$_3$)$_2$ and R' is H, or R and R' together are n-propylene to provide a 5-membered heterocycloalkyl group; and Q is acetate, cyano, (meth)acryl, N-pyrrolidone, and an N-caprolactam. In a specific embodiment, a poly (vinyl ester-co-N-protected amino acid O-vinyl ester) polymer is deprotected to produce a poly(vinyl ester-co-amino acid O-vinyl ester) polymer.

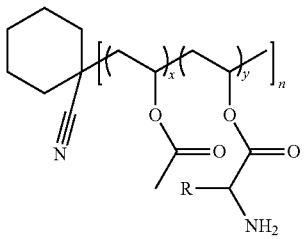

Deprotection conditions depend on the protecting group A, and are known to those of ordinary skill in the art. For example, deprotection of a Boc group can be effected by Bronsted or Lewis acid acidic deprotection, for example, using CF$_3$COOH at a temperature and for a time sufficient to deprotect at least a portion of the amine groups. Alternatives to CF$_3$COOH include p-toluenesulfonic acid, benzenesulfonic acid, methanesulfonic acid, trifluoromethanesulfonic acid, aqueous sulfuric acid (10 wt %), a combination of chlorotrimethylsilane/phenol, boron trifluoride-diethyl etherate, zinc chloride, zinc bromide, and ceric ammonium nitrate. In another specific embodiment, a poly(vinyl ester-co-N-protected amino acid O-vinyl ester) polymer is deprotected to produce a poly(vinyl alcohol-co-amino acid O-vinyl ester.HCl). In an embodiment, deprotection is performed in HCl (aq) in MeOH/H$_2$O. Deprotection with HCl results in simultaneous deprotection of the amino functionalities adjacent to the amino acid R and the vinyl esters. Alternatives to HCl include aqueous sulfuric acid (10 wt %), HBr, HI, zinc chloride, zinc bromide, p-toluenesulfonic acid, benzenesulfonic acid, methanesulfonic acid, trifluoromethanesulfonic acid, and combinations thereof. In one embodiment, deprotecting comprises removing at least a portion of the protecting groups A.

In an advantageous embodiment, selection of deprotection conditions can provide deprotection of both the amino-protecting groups A and unmasking of masked groups Q, for example an acetate or other ester moiety. For example, deprotection of poly(vinyl acetate-co-Boc amino acid vinyl ester) (P(VAc-co-BAAVE) enables facile access to both a relatively more hydrophobic copolymer of an AAVE and a vinyl ester (e.g., VAc) and the relatively more hydrophilic copolymer of an AAVE and a vinyl alcohol. Scheme 6 illustrates such a differential deprotection of a P(VAc-co-BAAVE) yielding polycations with variable hydrophilicities. In another embodiment, deprotecting comprises removing at least a portion of protecting groups A and unmasking at least a portion of groups Q.

Scheme 4

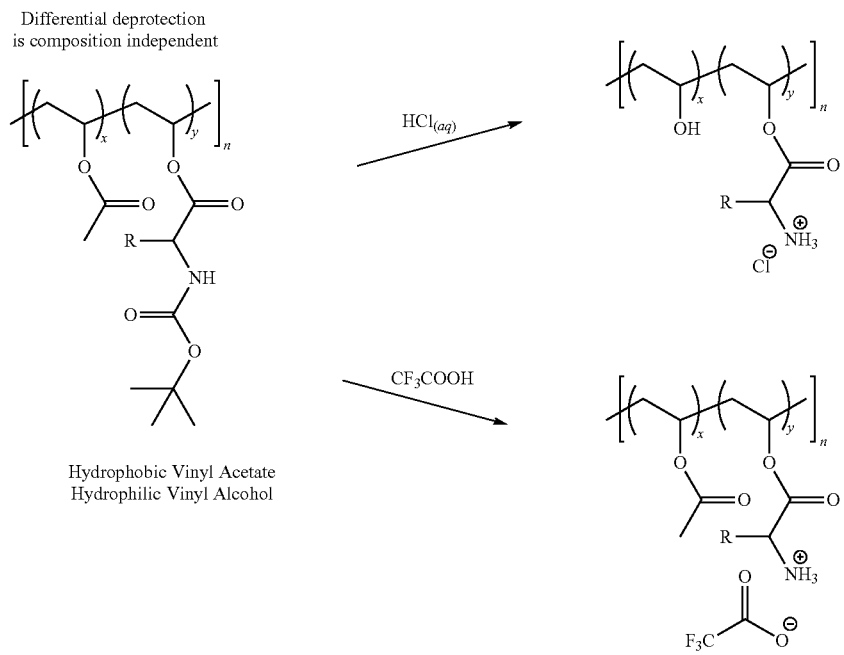

The deprotected polymers can be isolated by, for example, precipitation into a non-solvent including methanol, ethanol, propanol, butanol, benzene, toluene, hexane, heptane, octane, diethyl ether, or combinations thereof. The deprotected polymer can be isolated as the corresponding polycationic salt, or isolated and converted to the salt form by means known in the art.

Alternatively, or in addition, cation exchange can be performed on the deprotected polymer by dissolution of the polymer in water and dialysis of the polymer solution against any water soluble salt, provided that the molar quantity of salt is present in excess of the molar quantity of counterions to be exchanged. For the example, the trifluoroacetate counterion could be exchanged for chloride by dissolution of the polymer in water at some low concentration (1-15 wt %) followed by dialysis using an appropriate membrane against a NaCl(aq) solution.

In one embodiment, the polymers disclosed herein have antimicrobial properties. The term antimicrobial means the property of a material that enables it to kill, destroy, inactivate or neutralize an organism, or to prevent or reduce the growth, ability to survive, or propagation of a microorganism. The term microorganism includes bacteria, viruses, protozoa, yeasts, fungi, molds, or spores formed by any of the foregoing microorganisms.

In one embodiment, the polymers described herein inherently have antimicrobial properties. By inherent antimicrobial activity, it is meant that the polymers exhibit antimicrobial activity in the absence of any agents, compounds or additives that are not integral to the polymer. In another embodiment, the polymers further comprise an antimicrobial agent, either noncovalently linked through ionic interactions, for example, or covalently linked. Antibiotic agents include, for example, antibiotic metals and antibiotics such as tetracyclines, penicillin, ampicillin, cefazolin, clindamycin, erythromycin, levofloxacin, vancomycin, and mixtures thereof.

In one aspect, a polymer as described herein is applied to a substrate in the form of an aqueous or nonaqueous solution. It is also possible to utilize mixed solvents, such as water/alcohol mixtures, for application of the polymer to the substrate. The coating solution can be sprayed, wiped, dipped, or distributed by using other coating methods to coat a substrate's surface. The polymers can be present in a single layer or as part of a multi-layer film. Once the polymer is applied to a substrate, drying can be achieved, for example, by evaporation or freeze drying.

The polymers can be applied to a variety of substrates including cellulose, cellulose derivatives, hydroxyethyl cellulose, carboxymethyl cellulose, methyl cellulose, rayon, cotton, wood pulp, linen, polysaccharide, protein, wool, collagen, gelatin, chitin, chitosan, alginate, starch, silk, polyolefin, polyamide, fluoropolymer, polyvinyl chloride (PVC), vinyl, rubber, polylactide, polyglycolide, acrylic, polystyrene, polyethylene, polypropylene, nylon, polyester, polyurethane, silicone, and the like.

In one embodiment, the polymer is disposed on at least a portion of an orthopedic implant such as prosthetic implants or parts thereof, for example, hip implants, knee implants, elbow implants; prosthetic frames; bone prostheses; small joint prostheses; and fixation devices. Internal and external fixation implants and devices include bone plates, anchors, bone screws, rods, intramedullary nails, arthrodesis nails, pins, wires, spacers, and cages. Orthopedic implants can comprise solid metals, for example gold, silver, stainless steel, platinum, palladium, iridium, iron, nickel, copper, titanium, aluminum, chromium, cobalt, molybdenum, vanadium, tantalum, and alloys thereof. In certain embodiments, the orthopedic implant comprises a metal including surgical stainless steel, titanium or a titanium alloy.

The polymers can also be used as a coating for a medical device, including, but not limited to, an IV access device, medical tubing, a catheter assembly, and another viable medical-grade instrument that contacts fluids flowing into or out of a patient. The medical device can comprise, for example, one or more polycarbonates, polyurethanes, polyvinyl chlorides, silicones, PET plastics, styrene-butadiene rubbers, acrylics, and combinations thereof.

In another embodiment, the polymers disclosed herein are used for the delivery of therapeutic agents such as drugs, polynucleotides, peptides, or proteins, for example. The therapeutic agents can be mixed with the polymers and complexed through, for example, ionic interactions, or can be covalently attached to the polymer. The therapeutic agent may be associated with the polymer through a linking group, such as an amide, ester, carbonate or ether. Linking groups can be formed by chemically modifying one or more groups on the polymer.

The polynucleotide can be DNA or RNA. DNA can be in form of cDNA, in vitro polymerized DNA, plasmid DNA and fragments thereof, genetic material of viral origin, linear DNA, vectors, expression cassettes, chimeric sequences, recombinant DNA, chromosomal DNA, an oligonucleotide, anti-sense DNA, nicked DNA, and the like. RNA can be in the form of mRNA (messenger RNA), in vitro polymerized RNA, recombinant RNA, oligonucleotide RNA, tRNA (transfer RNA), snRNA (small nuclear RNA), rRNA (ribosomal RNA), chimeric sequences, anti-sense RNA, interfering RNA, siRNA (small interfering RNA), dicer substrate siRNA, miRNA (microRNA), external guide sequences, smRNA (small non-messenger RNAs), utRNA (untranslatedRNA), snoRNAs (24-mers, modified smRNA that act by an anti-sense mechanism), tiny non-coding RNAs (tncRNAs), small hairpin RNA (shRNA), locked nucleic acid (LNA), unlocked nucleic acid (UNA) and other RNA function inhibitors and activators, ribozymes, and the like. In one embodiment, the polynucleotide is an anti-sense polynucleotide that interferes with the function of the DNA and/or RNA to which it binds. Polynucleotides can be single, double, triple, or quadruple stranded.

In one embodiment, the polynucleotide contains an expression cassette that expresses a whole or partial protein, or RNA. The cassette can be natural or recombinant and contains the coding region of the gene of interest along with any other sequences that control expression of a gene. A DNA expression cassette typically includes a promoter for transcription initiation, and a sequence encoding one or more proteins. Optionally, the expression cassette can include, but is not limited to, transcriptional enhancers, non-coding sequences, splicing signals, transcription termination signals, and polyadenylation signals. An RNA expression cassette typically includes a translation initiation codon, and a sequence encoding one or more proteins. Optionally, the expression cassette can include, but is not limited to, translation termination signals, a polyadenosine sequence, internal ribosome entry sites (IRES), and non-coding sequences, as well as sh, siRNA, or micro RNAs.

In another embodiment, at least a portion of the polynucleotide is self-complementary, that is, at least a portion of the nucleotides in both strands are involved in nucleotide pairs, or they can form single-stranded regions, such as one or more of overhangs, bulges, loops, etc. The two strands forming the duplex structure can be different portions of one larger RNA molecule, or they can be separate RNA molecules. Wherein the two strands are connected by a hairpin loop, and the duplex structure consists of not more than 30 nucleotide pairs, the RNAi agent can be referred to herein as a short hairpin RNA (shRNA). Wherein the two strands are not connected, or connected by a strand linkage, and the duplex structure consists of not more than 30 nucleotide pairs, the RNAi agent can be referred to herein as a short interfering RNA (siRNA).

As used herein, the term "complementary," when used to describe a first nucleotide sequence in relation to a second nucleotide sequence, refers to the ability of an oligonucleotide or polynucleotide comprising the first nucleotide sequence to hybridize and form a duplex structure under certain conditions with an oligonucleotide or polynucleotide comprising the second nucleotide sequence. Such conditions can, for example, be stringent conditions, wherein stringent conditions include: 400 mM NaCl, 40 mM PIPES pH 6.4, 1 mM EDTA, 50° C. or 70° C. for 12-16 hours followed by washing. "Complementary" sequences can be fully complementary, or they can include mismatches, as long as they are still able to hybridize under the chosen conditions. In one embodiment, complementary sequences include not more than 1, not more than 2, not more than 3, not more than 4, or not more than 5 mismatches, if any.

In one embodiment, the polynucleotide is an RNA function inhibitor, a polynucleotide or polynucleotide analog containing a sequence ("inhibiting sequence") whose presence or expression in a cell alters the stability or trafficking of, or inhibits the function or translation of a specific cellular RNA, usually an mRNA, in a sequence-specific manner. In the case of mRNA, inhibition of RNA can thus effectively inhibit expression of a gene from which the RNA is transcribed. "Inhibit" or "down regulate" means that the activity of a gene expression product or level of RNAs or equivalent RNAs is reduced below that observed in the absence of the polynucleotide.

Exemplary RNA function inhibitors include siRNA, interfering RNA or RNAi, shRNA, dsRNA, RNA polymerase transcribed DNAs, ribozymes, and antisense polynucleotide, which can be RNA, DNA, or artificial polynucleotide. In one embodiment, siRNA comprises a double stranded structure containing 15 to 50 base pairs and preferably 21 to 25 base pairs and having a nucleotide sequence identical or nearly identical to an expressed target gene or RNA within the cell. siRNA also includes modified siRNAs such as 27-nucleotide dicer substrates, meroduplex siRNAs (siRNAs with a nick or gap in the sense strand), and usiRNAs (siRNAs modified with non-nucleotide acyclic monomers known as unlocked nucleobase analogs), and other modified siRNAs. Antisense polynucleotides include, but are not limited to: morpholinos, 2'-O-methyl or 2-'F-polynucleotides, DNA, RNA, locked nucleic acids, and the like. RNA polymerase transcribed DNAs can be transcribed to produce small hairpin RNAs in the cell that can function as siRNA or linear RNAs that can function as antisense RNA. The inhibitor can be polymerized in vitro, can be delivered as a recombinant construct to produce the RNA in a cell, contain chimeric sequences, or derivatives of these groups.

In one embodiment, the polynucleotide is a siRNA, a short polynucleotide molecule that can be unmodified or modified chemically. In other embodiments the siRNA is a 15 to 30 mer, specifically 15, 16, 17, 18, 19, 20, 21, 22, 23, 24, 25, 26, 27, 28, 29 or 30-mer siRNA.

In certain embodiments, the polymers described herein may be in the form of a particle such as a nanoparticle or a microparticle, particularly when complexed with a therapeutic agent.

In one embodiment, a cationic polymer as disclosed herein may be used an adjuvant or an immunostimulant. Immunostimulants are agents that initiate an immune response, or catalyze immune response. Adjuvants are immunostimulants that have no antigen or immunogen-specific effect by themselves, but can stimulate the immune system to respond to a specific immunogen or a group of immunogens.

A polymer as disclosed herein can be in the form of a pharmaceutical composition. As used herein, "pharmaceutical composition" means therapeutically effective amounts of the compound together with a pharmaceutically acceptable excipient, such as diluents, preservatives, solubilizers, emulsifiers, and adjuvants. As used herein "pharmaceutically acceptable excipients" are well known to those skilled in the art.

Tablets and capsules for oral administration may be in unit dose form, and may contain conventional excipients such as binding agents, for example syrup, acacia, gelatin, sorbitol, tragacanth, or polyvinyl-pyrrolidone; fillers for example lactose, sugar, maize-starch, calcium phosphate, sorbitol or glycine; tabletting lubricant, for example magnesium stearate, talc, polyethylene glycol or silica; disintegrants for example potato starch, or acceptable wetting agents such as sodium lauryl sulphate. The tablets may be coated according to methods well known in normal pharmaceutical practice. Oral liquid preparations may be in the form of, for example, aqueous or oily suspensions, solutions, emulsions, syrups or elixirs, or may be presented as a dry product for reconstitution with water or other suitable vehicle before use. Such liquid preparations may contain conventional additives such as suspending agents, for example sorbitol, syrup, methyl cellulose, glucose syrup, gelatin hydrogenated edible fats; emulsifying agents, for example lecithin, sorbitan monooleate, or acacia; non-aqueous vehicles (which may include edible oils), for example almond oil, fractionated coconut oil, oily esters such as glycerine, propylene glycol, or ethyl alcohol; preservatives, for example methyl or propyl p-hydroxybenzoate or sorbic acid, and if desired conventional flavoring or coloring agents.

For topical application to the skin, the drug may be made up into a cream, lotion or ointment. Cream or ointment formulations which may be used for the drug are conventional formulations well known in the art. Topical administration includes transdermal formulations such as patches.

For topical application to the eye, the inhibitor may be made up into a solution or suspension in a suitable sterile aqueous or nonaqueous vehicle. Additives, for instance buffers such as sodium metabisulphite or disodium EDTA; preservatives including bactericidal and fungicidal agents such as phenyl mercuric acetate or nitrate, benzalkonium chloride or chlorhexidine, and thickening agents such as hypromellose may also be included.

The active ingredient may also be administered parenterally in a sterile medium, either subcutaneously, or intravenously, or intramuscularly, or intrasternally, or by infusion techniques, in the form of sterile injectable aqueous or oleaginous suspensions. Depending on the vehicle and concentration used, the drug can either be suspended or dissolved in the vehicle. Advantageously, adjuvants such as a local anaesthetic, preservative and buffering agents can be dissolved in the vehicle.

Pharmaceutical compositions may conveniently be presented in unit dosage form and may be prepared by any of the methods well known in the art of pharmacy. The term "unit dosage" or "unit dose" means a predetermined amount of the active ingredient sufficient to be effective for treating an indicated activity or condition. Making each type of pharmaceutical composition includes the step of bringing the active compound into association with a carrier and one or more optional accessory ingredients. In general, the formulations are prepared by uniformly and intimately bringing the active compound into association with a liquid or solid carrier and then, if necessary, shaping the product into the desired unit dosage form.

The invention is further illustrated by the following non-limiting examples.

EXAMPLES

Materials

All reagents were purchased from Sigma-Aldrich Chemical Co. (Milwaukee, Wis., USA) and used as received unless otherwise noted. 1,1'-Azobis(cyclohexane-1-carbonitrile) (V-40; Wako Chemicals, USA) was recrystallized from methanol prior to use. Vinyl acetate (VAc) was stirred over $NaBH_4$ for 3 hours and fractionally distilled prior to use in polymerizations. p-Benzoquinone was purified by sublimation under reduced pressure prior to use. Anhydrous THF was obtained by sparging analytical grade solvent with nitrogen for 30 minutes followed by cycling through a column of activated alumina in a Vacuum Atmospheres Solvent purification system.

Absolute molecular weights ($M_n$) were determined for homopolymers and copolymers using size exclusion chromatography (SEC) analyses performed on a Viscotek GPC-Max System equipped with two Polymer Labs Resipore columns (250 mm×4.6 mm), and a differential refractometer (RI), a two angle-light scattering module (7° and 90°), and a four-capillary differential viscometer at 40° C. using tetrahydrofuran (THF) as the mobile phase with a flow rate of 0.8 mL/min. The triple-detection apparatus was calibrated using a narrow molecular weight distribution polystyrene standard ($M_n$=86.7 kg/mol, $M_w/M_n$=1.04). The refractive index increment do/dc for each homopolymer or copolymer was determined by linear regression of the integrated RI detector response as a function of sample concentration using a baseline value of $n_{THF}$=1.398 at 40° C. Molecular weight distributions of homopolymers and copolymers were determined using a conventional calibration curve that was constructed from 10 narrow molecular weight distribution polystyrene standards ($M_n$=0.580-377.4 kg/mol).

$^1$H-NMR spectra were acquired on a Varian INOVA-500 spectrometer and were referenced to the residual protiated solvent peak in DMSO-$d_6$ or a $(CH_3)_4Si$ internal standard in $CDCl_3$ or acetone-$d_6$. $^{13}$C-NMR spectra were acquired on a Varian UNITY-500 spectrometer and were referenced to the solvent peak.

Example 1: Synthesis of (N-tert-butoxycarbonyl)glycine vinyl ester (BGVE)

(N-tert-butoxycarbonyl)glycine (12.0 g, 68.6 mmol) was dissolved in VAc (300 mL, 3.24 mol). KOH (0.391 g, 6.96 mmol), p-benzoquinone (0.149 g, 1.38 mmol), and $Pd(OAc)_2$ (0.154 g, 0.686 mmol) were added sequentially to this vinyl ester mixture at 22° C. After 36 hours, $NaBH_4$ (0.150 g, 3.97 mmol) was added and the reaction mixture was stirred for an additional 0.5 hours. The reaction mixture was then filtered through a pad of Celite, which was washed with 200 mL EtOAc. Concentration of the filtrate by rotary evaporation yielded an orange viscous oil, which was dissolved in EtOAc (250 mL), washed with saturated $NaHCO_3$ (aq) (2×200 mL) and saturated brine (1×200 mL), and dried over $MgSO_4$(s). The crude product was isolated by rotary evaporation, and purified by column chromatography (75:25 v/v hexanes/EtOAc) followed by vacuum distillation to yield a viscous, pale yellow oil (65.3% yield). $^1$H NMR (500 MHz, DMSO-$d_6$, 24° C.): δ 1.39 (s, 9H), 3.80 (d, 2H), 4.69

(dd, 1H), 4.92 (dd, 1H), 7.21 (dd, 1H), 7.32 (t, 1H). $^{13}$C NMR (500 MHz, DMSO-d$_6$, 24° C.): δ 28.1, 41.7, 78.4, 98.6, 141.1, 155.9, 168.0.

Example 2: Synthesis of (N-tert-butoxycarbonyl)proline vinyl ester (BPVE)

(N-tert-butoxycarbonyl)proline (15.01 g, 69.7 mmol) was dissolved in vinyl pivalate (250 mL, 1.81 mol) at 60° C. KOH (0.400 g, 7.12 mmol), p-benzoquinone (0.153 g, 1.42 mmol), and Pd(OAc)$_2$ (0.159 g, 0.708 mmol) were added sequentially at 60° C. After 20 hours, the reaction was filtered through a pad of Celite to remove precipitated Pd(0) and this pad was washed with EtOAc (200 mL). Removal of the solvent in vacuo resulted in a brown oil that was taken up in EtOAc (250 mL), washed with saturated NaHCO$_3$(aq) (2×200 mL) and brine (1×200 mL). The organic layer was then dried over MgSO$_4$(s) and the product isolated by rotary evaporation. The crude product was purified by column chromatography (75:25 v/v hexanes/EtOAc) and subsequent vacuum distillation to yield the monomer as a viscous, clear, colorless oil (62.3% yield). $^1$H NMR (500 MHz, DMSO-d$_6$, 24° C.: δ 1.30, 1.38 (s, 9H), 1.84 (m, 3H), 2.22 (m, 1H), 3.32 (m, 2H), 4.21 (m, 1H), 4.70 (1H), 4.92 (1H), 7.21 (dd, 1H). $^{13}$C NMR (500 MHz, DMSO-d$_6$, 24° C.): δ 24.3, 28.7, 30.4, 46.9, 59.0, 79.8, 99.4, 141.9, 153.8, 170.7.

Example 3: Synthesis of (N-tert-butoxycarbonyl)alanine vinyl ester (BAVE)

(N-tert-butoxycarbonyl)alanine (15.0 g, 79.3 mmol) was dissolved in VAc (300 mL, 3.24 mol). KOH (0.455 g, 8.11 mmol), p-benzoquinone (0.176 g, 1.63 mmol), and Pd(OAc)$_2$ (0.178 g, 0.79 mmol) were added sequentially at 22° C. and the reaction was stirred. After 36 hours, NaBH$_4$ (0.150 g, 3.97 mmol) was added and the reaction mixture was stirred for an additional 0.5 hours. The reaction mixture was then filtered through a pad of Celite, which was washed with 200 mL EtOAc. Concentration of the filtrate by rotary evaporation yielded an orange viscous oil, which was dissolved in EtOAc (250 mL), washed with saturated NaHCO$_3$ (aq) (2×200 mL) and saturated brine (1×200 mL), and dried over MgSO$_4$(s). Rotary evaporation of the solvent yielded a crude product that was purified by column chromatography (75:25 v/v hexanes/EtOAc) and subsequent vacuum distillation to yield a viscous, clear, colorless oil (78.9% yield). $^1$H NMR (500 MHz, DMSO-d$_6$, 24° C.): δ 1.13 (d, 3H), 1.32 (s, 9H), 4.04 (m, 1H), 4.67 (d, 1H), 4.87 (d, 1H), 7.15 (dd, 1H), 7.38 (d, 1H). $^{13}$C NMR (500 MHz, DMSO-d$_6$, 24° C.): δ 16.4, 27.8, 28.1, 48.8, 78.3, 98.7, 141.3, 155.3, 170.6.

Example 4: Synthesis of (N-tert-butoxycarbonyl)-valine vinyl ester (BVVE)

(N-tert-butoxycarbonyl)valine (15.0 g, 69.1 mmol) was dissolved in VAc (300 mL, 3.24 mol). KOH (0.380 g, 6.77 mmol), p-benzoquinone (0.151 g, 1.40 mmol), and Pd(OAc)$_2$ (0.119 g, 0.53 mmol) were added sequentially at 22° C. and the reaction was stirred. After 36 h, NaBH$_4$ (0.150 g, 3.97 mmol) was added and the reaction mixture was stirred for an additional 0.5 h. The reaction mixture was then filtered through a pad of Celite, which was washed with 200 mL EtOAc. Concentration of the filtrate by rotary evaporation yielded a light yellow viscous oil, which was dissolved in EtOAc (250 mL), washed with NaHCO$_3$(aq) (2×200 mL) and saturated brine (1×200 mL), and dried over MgSO$_4$(s). Rotary evaporation of the solvent yielded a crude product that was purified by column chromatography (75:25 v/v hexanes/EtOAc) and subsequent vacuum distillation to yield a viscous, clear, colorless oil (72.4% yield). $^1$H NMR (500 MHz, DMSO-d$_6$, 24° C.): δ 0.90 (d, 6H), 1.39 (s, 9H), 2.05 (m, 1H), 3.89 (t, 1H), 4.70 (dd, 1H), 4.92 (dd, 1H), 7.21 (dd, 1H), 7.33 (d, 1H). $^{13}$C NMR (500 MHz, DMSO-d$_6$, 24° C.): δ 19.3, 28.8, 30.0, 60.0, 79.0, 99.4, 141.8, 156.5, 170.3.

Example 5: Synthesis of poly((N-tert-butoxycarbonyl)glycine vinyl ester) (P(BGVE))

A mixture of V-40 (6.2 mg, 0.025 mmol) and BGVE (1.01 g, 5.0 mmol) was sealed in a flask, degassed by three freeze-pump-thaw cycles, and placed in an oil bath at 88° C. After 3.5 hours, the polymerization reaction was removed from the oil bath and stopped by rapid cooling in an ice bath. The reaction mixture was dissolved in CH$_2$Cl$_2$ (5 mL) and the resulting polymer was precipitated into stirring hexanes (400 mL) and dried in vacuo at room temperature to yield P(BGVE). $^1$H NMR (500 MHz, DMSO-d$_6$, 24° C.): δ 1.38 (9H; —C(CH$_3$)$_3$), 1.81 (2H; backbone —CH$_2$), 3.65 (2H; NHCH$_2$C=O), 4.81 (1H; backbone —CH), 7.01 (1H; CH$_2$NHC=O). $^{13}$C NMR (500 MHz, DMSO-d$_6$, 24° C.): δ 27.9, 28.1, 38.6, 41.7, 67.5, 78.2, 155.7, 169.8. Molecular weight: M$_n$=12.3 kg/mol (dn/dc=0.0664 mL/g), M$_w$/M$_n$=1.927 (against PS Stds)

Example 6: Synthesis of poly((N-tert-butoxycarbonyl)alanine vinyl ester) (P(BAVE))

V-40 (0.50 mL, 0.05 M solution in C$_6$H$_6$) and BAVE (0.56 g, 2.6 mmol) were combined in a Schlenk flask and degassed by three freeze-pump-thaw cycles, and this reaction mixture was placed in an oil bath at 88° C. After 20.6 hours, the reaction was removed from the oil bath and terminated by rapid cooling in a 0° C. ice bath. The reaction mixture was dissolved in THF (5 mL) and the resulting polymer was precipitated into stirring hexanes (400 mL) and subsequently freeze-dried from C$_6$H$_6$ at room temperature to yield P(BAVE). $^1$H NMR (500 MHz, DMSO-d$_6$, 24° C.): δ 1.24 (3H, —CHCH$_3$), 1.37 (9H; —C(CH$_3$)$_3$), 1.81 (2H; backbone —CH$_2$), 3.97 (1H; NHCHC=O), 4.78 (1H; backbone —CH), 7.06 (1H; CHNHC=O). $^{13}$C NMR (500 MHz, DMSO-d$_6$, 24° C.): δ 19.8, 31.3, 52.1, 70.4, 81.2, 157.2, 158.1, 175.4. Molecular weight: M$_n$=18.3 kg/mol (dn/dc=0.0659 mL/g), M$_w$/M$_n$=1.60 (against PS Stds).

Example 7: Synthesis of poly((N-tert-butoxycarbonyl)proline vinyl ester) (P(BPVE))

A mixture of V-40 (5.7 mg, 0.023 mmol) and BPVE (1.01 g, 4.2 mmol) was sealed in a flask, degassed by three freeze-pump-thaw cycles, and placed in an oil bath at 88° C. After 3.5 hours, the reaction was removed from the oil bath and terminated by rapid cooling in an ice bath. The reaction mixture was diluted with CH$_2$Cl$_2$ (5 mL) and precipitated into stirring hexanes (400 mL). The isolated solids were subsequently freeze-dried from C$_6$H$_6$ at room temperature to yield P(BPVE). $^1$H NMR (500 MHz, CDCl$_3$, 24° C.): δ 1.44 (9H; —C(CH$_3$)$_3$), 1.88 (4H; CHCH$_2$CH$_2$CH$_2$NC=O), 2.10 (2H; backbone —CH$_2$), 3.44 (2H; CH$_2$NC=O), 4.23 (1H; NCHC=O), 4.88 (1H; backbone —CH). $^{13}$C NMR (500 MHz, DMSO-d$_6$, 24° C.): 23.7, 24.7, 27.4, 28.8, 30.2, 31.2, 46.7, 59.0, 79.7, 154.2, 172.3. Molecular weight: $M_n$=31.0 kg/mol (dn/dc=0.0713), $M_w/M_n$=1.74 (against PS Stds).

Example 8: Synthesis of poly((N-tert-butoxycarbonyl)valine vinyl ester) (P(BVVE)

A solution of V-40 (21.6 mg, 0.088 mmol) and BVVE (1.51 g, 6.2 mmol) in $C_6H_6$ (2.5 mL) was degassed by three freeze-pump-thaw cycles. The flask was partially backfilled with $N_2$(g) to approximately 220 mm Hg, and placed in an oil bath at 88° C. After 15.5 hours, the reaction was removed from the oil bath and terminated by rapid cooling in an ice bath. The reaction mixture was precipitated into stirring cold hexanes (2×400 mL) and subsequently freeze-dried from $C_6H_6$ at room temperature to yield P(BVVE). $^1$H NMR (500 MHz, $CDCl_3$, 24° C.): δ 0.892 and 0.974 (6H; —CH($CH_3$)$_2$, 1.44 (9H; —C($CH_3$)$_3$), 1.92 (2H; backbone $CH_2$), 2.12 (1H; —CH($CH_3$)$_2$), 4.16 (1H, NHCHC=O), 4.86 (1H; backbone —CH), 5.37 (1H; CHNHC=O). $^{13}$C NMR (500 MHz, $CDCl_3$, 24° C.): 17.6, 19.6, 28.5, 31.2, 39.5, 58.8, 68.7, 79.5, 155.8, 171.9. Molecular weight: $M_n$=36.6 kg/mol (dn/dc=0.0704 mL/g), $M_w/M_n$=1.64 (against PS Stds).

The molecular characteristics of P(BAAVE) homopolymers of Examples 5-8 are given in Table 1. Using [monomer]:[V-40]=70-200, we obtained unimodal polymers derived from BGVE, BAVE, BVVE, and BPVE having absolute molecular weights $M_n$ approximately 12-37 kg/mol. Note that the polymerization behavior of these monomers can depend upon their purity: fast and reproducible polymerizations are achieved for monomers that have been scrupulously purified.

TABLE 1

Poly(Boc-amino acid vinyl ester) (P(BAAVE)) produced by free radical polymerization

| sample[a] | polym. rxn. time (h) | % conv[b] | $M_n$ (kg/mol)[c] | $M_w/M_n$[d] |
|---|---|---|---|---|
| P(BGVE)-1 | 3.5 | 33.8 | 12.3 | 1.93 |
| P(BVVE)-1 | 15.5[e] | 33.0 | 36.6 | 1.64 |
| P(BPVE)-1 | 3.5 | 25.4 | 31.0 | 1.74 |
| P(BAVE)-1 | 20.6[e] | 20.8 | 18.3 | 1.60 |

[a]All polymerizations were conducted at 88° C. using V-40 as the initiator with [monomer]:[V-40] = 70-200.
[b]Monomer conversion determined gravimetrically.
[c]Absolute $M_n$ determined by triple detection SEC.
[d]Determined by SEC against poly(styrene) standards.
[e]Polymerizations were conducted in $C_6H_6$ as a diluent, thus longer reaction times were used.

Example 9: Representative N-Boc-deprotection of P(BGVE) to poly(vinyl ammonium glycinate trifluoroacetate) (P(VGly.CF$_3$COOH)

P(BGVE)-1 (50.1 mg, 0.25 mmol N-Boc groups) was dissolved in $CF_3COOH$ (1 mL, 0.013 mol) and placed in a 60° C. oil bath. After 1 hour, the excess $CF_3COOH$ was removed by rotary evaporation and the resulting P(VGly.CF$_3$COOH) was purified by co-evaporation with EtOH (3×5 mL) and trituration with hexanes (3×15 mL). The polymer was centrifuged and dried in vacuo at room temperature. $^1$H NMR (500 MHz, DMSO-$d_6$, 24° C.): δ 1.90 (2H; backbone —$CH_2$), 3.81 (2H; α-$CH_2$), 4.92 (1H; backbone —CH), 8.57 (3H; —$NH_3$). $^{13}$C NMR (500 MHz, DMSO-$d_6$, 24° C.): δ 38.1, 40.8, 69.1, 69.2, 69.9, 116.9 (q, 1C), 159.2 (q, 1C), 167.4, 167.6, 167.7.

Boc-deprotection of the pendant amine functionalities of P(BGVE) using neat $CF_3COOH$ at 60° C. efficiently yields the polycationic poly(vinyl ammonium glycinate trifluoroacetate) (P(VGly.CF$_3$COOH)), which is very soluble in water, MeOH, and EtOH. The deprotection reaction proceeds quantitatively as assessed by $^1$H NMR spectroscopy. (FIG. 1)

Example 10: Representative synthesis of poly(VAc-co-BGVE)-7

V-40 (0.0767 g, 0.314 mmol), BGVE (0.509 g, 2.53 mmol), and VAc (1.63 mL, 17.6 mmol) were dissolved in $C_6H_6$ (10 mL), sealed in a 100 mL Schlenk tube, and degassed by three freeze-pump-thaw cycles. The reaction flask was backfilled with $N_2$(g) to approximately 220 mm Hg and heated to 88° C. while stirring. After 18 hours, the reaction was terminated by rapid cooling in an ice bath. The reaction mixture was concentrated by rotary evaporation, dissolved in $CH_2Cl_2$ (5 mL), and the polymer was precipitated into stirring hexanes (800 mL) (3×). The resulting solids were freeze-dried from $C_6H_6$ to yield P(VAc-co-BGVE)-7. $^1$H NMR (500 MHz, DMSO-$d_6$, 24° C.): δ 1.38 (9H; N-Boc —C($CH_3$)$_3$), 1.75 (4H; VAc and BGVE backbone $CH_2$), 1.94 (3H; VAc $CH_3$), 3.59 and 3.62 (2H; BGVE α-$CH_2$), 4.78 (2H; VAc and BGVE backbone CH), 7.13 (1H; BGVE NH). Molecular weight: $M_n$=9.1 kg/mol (dn/dc=0.0705), $M_w/M_n$ =2.02 (against PS Stds).

Example 11: Representative synthesis of poly(VAc-co-BVVE)

V-40 (73.8 mg, 0.302 mmol), BVVE (0.976 g, 4.01 mmol), and VAc (1.49 mL, 16.1 mmol) were codissolved in $C_6H_6$ (10 mL), and this solution was sealed in a 100 mL Schlenk tube and degassed by three freeze-pump-thaw cycles. Upon backfilling the flask with $N_2$(g) to approximately 220 mm Hg, the reaction flask was heated to 88° C. while stirring. After 15 hours, the reaction was terminated by rapid cooling in an ice bath and exposed to air. The reaction mixture was diluted with $CH_2Cl_2$ and precipitated into stirring hexanes (3×800 mL). The isolated solids were then freeze-dried from $C_6H_6$ to yield P(VAc-co-BVVE)-2. $^1$H NMR (500 MHz, DMSO-$d_6$, 24° C.): δ 0.87 (6H; BVVE CH($CH_3$)$_2$), 1.38 (9H; BVVE —C($CH_3$)$_3$), 1.74 (4H; VAc and BVVE backbone —$CH_2$), 1.93 (3H; VAc —$CH_3$), 3.83 (1H; BVVE α-CH), 4.77 (2H; VAc and BVVE backbone —CH), 7.06 (1H; BVVE NH). $^{13}$C NMR (500 MHz, DMSO-$d_6$, 24° C.): δ 18.0, 19.1, 20.7, 28.1, 29.4, 38.0, 38.4, 59.3, 66.7, 66.9, 67.8, 78.1, 128.3, 155.7, 169.7, 171.3. Molecular weight: $M_n$=26.5 kg/mol (dn/dc=0.0626 mL/g), $M_w/M_n$=2.00 (against PS Stds).

Figure 2:
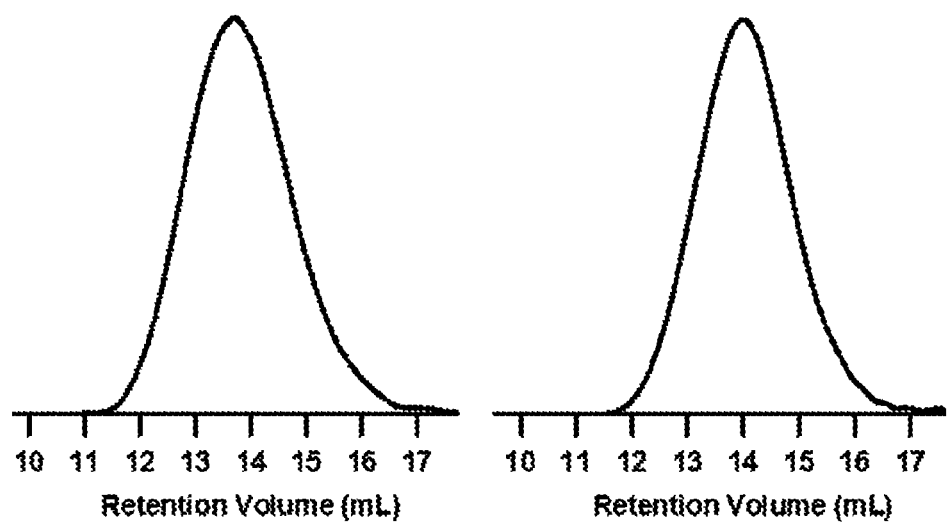
FIG. 2 shows SEC traces of P(VAc-co-BVVE)-3 (left) and P(VAc-co-BPVE)-1 (right) using refractive index detection demonstrate unimodal molecular weight distributions of random copolymers.

FIG. 2 shows SEC traces of P(VAc-co-BVVE)-3 (left) and P(VAc-co-BPVE)-1 (right) using refractive index detection demonstrate unimodal molecular weight distributions of random copolymers.

Example 12: Synthesis of poly(VAc-co-BPVE)

V-40 (72.8 mg, 0.298 mmol), BPVE (0.974 g, 4.04 mmol), and VAc (1.39 mL, 16.1 mmol) were co-dissolved in $C_6H_6$ (10 mL). The solution was sealed in a 100 mL Schlenk tube, degassed by three freeze-pump-thaw cycles, backfilled with $N_2$(g) to approximately 220 mm Hg, and heated to 88° C. while stirring. After 17.5 hours the reaction was terminated by rapid cooling in an ice bath and exposed to air. The resulting copolymerization reaction was diluted with $CH_2Cl_2$ and precipitated into stirring hexanes (3×800 mL), and the solids were freeze-dried from $C_6H_6$ to yield P(VAc-co-BPVE)-1. $^1$H NMR (500 MHz, DMSO-d$_6$, 24° C.): δ 1.35 and 1.39 (9H; BPVE —C(CH$_3$)$_3$), 1.76 (4H; VAc and BPVE backbone —CH$_2$), 1.94 (3H; VAc —CH$_3$), 2.17, 3.32 (2H; BPVE CH$_2$NC=O), 4.14 (1H, NCHC=O), 4.78 (2H; VAc and BPVE backbone —CH). Molecular weight: $M_n$=13.5 kg/mol (dn/dc=0.0784 mL/g), $M_w/M_n$=2.19 (against PS Stds).

Example 13: Synthesis of poly(VAc-co-BAVE)

V-40 (74.9 mg, 0.306 mmol), BAVE (0.866 g, 4.02 mmol), and VAc (1.49 mL, 16.1 mmol) were dissolved in $C_6H_6$ (10 mL). The solution was sealed in a 100 mL Schlenk tube, degassed by three freeze-pump-thaw cycles, backfilled with $N_2$(g) to approximately 220 mm Hg, and placed in an oil bath at 88° C. while stirring. After 17 hours, the reaction was terminated by rapid cooling in an ice bath and exposure to air. The resulting copolymer was precipitated out of a $CH_2Cl_2$ solution into stirring hexanes (3×800 mL) and the solids were freeze-dried from $C_6H_6$ to yield P(VAc-co-BAVE)-1. $^1$H NMR (500 MHz, DMSO-d$_6$, 24° C.): δ 1.24 (3H, BAVE —CHCH$_3$), 1.38 (9H; BAVE —C(CH$_3$)$_3$), 1.76 (4H; VAc and BAVE backbone —CH$_2$), 1.95 (3H; VAc —CH$_3$), 3.95 (1H; BAVE NHCHC=O), 4.68 (2H; VAc and BAVE backbone —CH), 7.12 (1H, BAVE CHNHC=O). Molecular weight: $M_n$=15.9 kg/mol (dn/dc=0.0605 mL/g), $M_w/M_n$=1.96 (against PS Stds).

Figure 3:
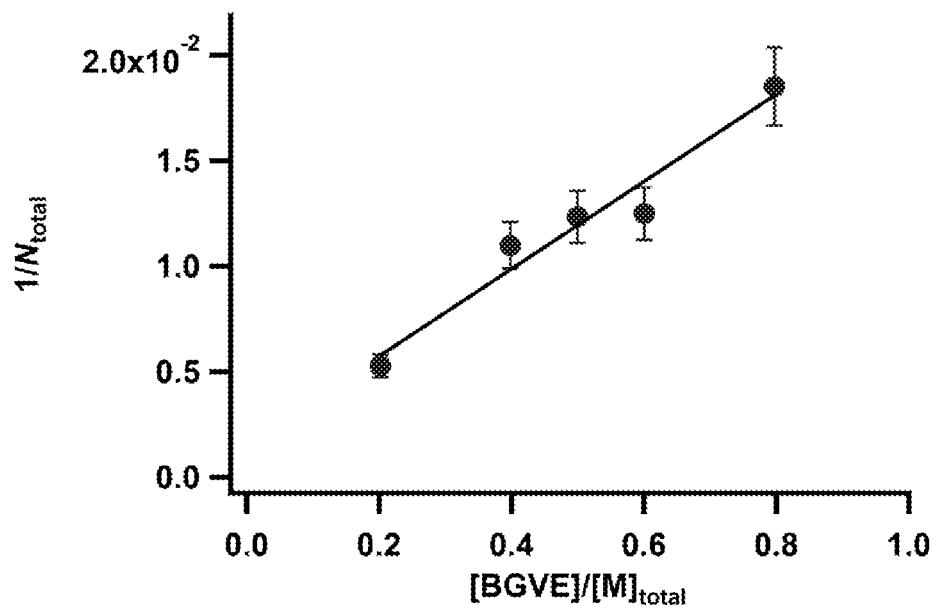
FIG. 3 is a Mayo-Lewis plot of $1/N_{total}$ versus $[BGVE]/[M]_{total}$ based on P(VAc-co-BGVE) samples 1-5 (from Table 2) demonstrating a near linear relationship, suggestive of the fact that chain transfer to BGVE monomer contributes the observed trend of decreasing degree of polymerization ($N_{total}$) with increasing [BGVE] in the copolymerization feed. The error bars in this plot derive from the estimated 10% error in the values of $1/N_{total}$ that were derived from absolute copolymer molecular weights determined by size-exclusion chromatography with triple detection.

The molecular characteristics of a representative set of copolymers containing BAAVE comonomers are given in Table 2. It was noted that the molecular weights of VAc/BGVE copolymers correlate with the concentration of BGVE in the copolymerization feed. Since the copolymerization data tabulated in entries 1-5 of Table 2 was acquired with a near constant $[M_{total}]/[V-40]^{1/2}$ approximately 40, it was expected that the kinetic chain length and thus the average degree of polymerization ($N_{total}$) of the resulting polymers should be nearly constant in the absence of chain transfer processes. Contrary to this expectation, careful examination of these copolymerization data reveals that the degree of polymerization ($N_{total}$) decreases with increasing [BGVE] in the copolymerization feed. Since these results suggested the possibility of chain transfer to BGVE, the data in Table 2 were used to construct a Mayo-Lewis plot of $N_{total}$ versus [BGVE]/[M]$_{total}$, where [M]$_{total}$ is the total monomer concentration in the polymerization reaction (FIG. 3). From the Mayo-Lewis equation and the plot shown in FIG. 3:

$$\frac{1}{v_{tr}} = \frac{1}{v} + C_{BGVE} \frac{[BGVE]}{[M]_{total}} \quad \text{(Equation 1)}$$

where $v_{tr}$ is the kinetic chain length when chain transfer is operative, v is the kinetic chain length in the absence of any chain transfer events, $C_{BGVE}$=0.021 is the chain transfer constant for BGVE, and [M]$_{total}$ is the total monomer concentration in the polymerization. The linearity of this plot supports the notion that chain transfer to BGVE reduces the copolymer molecular weight. It is noted that P(VAc-co-BGVE)-7 exhibits a much lower N. than P(VAc-co-BVVE)-3, in spite of their syntheses at similar comonomer feed compositions and polymerization reaction times. This observation suggests that chain transfer to BVVE is slower than BGVE. Without being held to theory, it is hypothesized that chain transfer to BGVE occurs by hydrogen atom abstraction of one of the activated methylene hydrogens of BGVE by the propagating radical chain end. Alkylation of this methylene group as in BVVE likely diminishes the propensity for chain transfer, by virtue of the steric protection afforded by the isopropyl side chain of valine.

TABLE 2

Poly(vinyl acetate-co-Boc amino acid vinyl ester)s (P(VAc-co-BAAVE)) synthesized by free radical copolymerization.

| Sample | Reaction time (h) | [VAc]$_{feed}$ (M) | [BAAVE]$_{feed}$ (M) | [V-40] (M) | [BAAVE]$^a$ | dn/dc (mL/g) | $M_n$ (kg/mol)$^b$ | $N_{total}$$^c$ | $M_w/M_n$$^d$ |
|---|---|---|---|---|---|---|---|---|---|
| P(VAc-co-BGVE)-1 | 0.28$^e$ | 7.13 | 1.80 | 0.0506 | 0.250 | 0.041 | 21.7 | 189 | 1.70 |
| P(VAc-co-BGVE)-2 | 0.35$^e$ | 4.59 | 3.04 | 0.0394 | 0.483 | 0.062 | 11.0 | 91 | 1.71 |
| P(VAc-co-BGVE)-3 | 0.38$^e$ | 3.55 | 3.55 | 0.0354 | 0.581 | 0.060 | 12.4 | 81 | 1.65 |
| P(VAc-co-BGVE)-4 | 0.40$^e$ | 2.65 | 3.99 | 0.0285 | 0.690 | 0.062 | 13.2 | 80 | 1.64 |
| P(VAc-co-BGVE)-5 | 0.43$^e$ | 1.20 | 4.70 | 0.0236 | 0.862 | 0.064 | 10.0 | 54 | 1.62 |
| P(VAc-co-BGVE)-6 | 20.0 | 0.712 | 0.111 | 0.0444 | 0.146 | 0.065 | 4.4 | 42 | 1.81 |
| P(VAc-co-BGVE)-7 | 18.0 | 1.45 | 0.209 | 0.0259 | 0.134 | 0.070 | 9.1 | 90 | 2.02 |
| P(VAc-co-BVVE)-1 | 14.0 | 1.31 | 0.188 | 0.0206 | 0.135 | 0.069 | 18.9 | 176 | 2.15 |
| P(VAc-co-BVVE)-2 | 15.0 | 1.30 | 0.323 | 0.0243 | 0.212 | 0.063 | 26.5 | 222 | 2.00 |
| P(VAc-co-BVVE)-3 | 18.0 | 1.50 | 0.151 | 0.0251 | 0.095 | 0.060 | 16.1 | 160 | 2.41 |
| P(VAc-co-BVVE)-4 | 19.0 | 1.05 | 0.524 | 0.0229 | 0.336 | 0.062 | 29.0 | 209 | 2.27 |
| P(VAc-co-BPVE)-1 | 17.5 | 1.30 | 0.325 | 0.0240 | 0.204 | 0.078 | 13.5 | 115 | 2.19 |
| P(VAc-co-BAVE)-1 | 17.0 | 1.31 | 0.327 | 0.0249 | 0.150 | 0.060 | 15.9 | 130 | 1.96 |

$^a$Mole fraction of BAAVE in the isolated polymer calculated from quantitative $^1$H NMR spectroscopy.
$^b$Absolute $M_n$ determined by triple detection SEC.
$^c$Degree of polymerization calculated from [BAAVE] and $M_n$.
$^d$Determined by SEC against poly(styrene) standards.
$^e$Monomer conversions were limited to ≤ 8.5 wt % as determined by gravimetric analysis.

Figure 4:
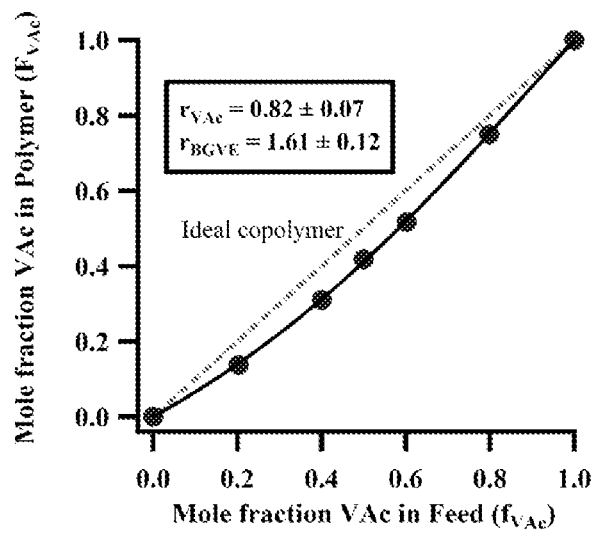
FIG. 4 is a plot of mole fraction of VAc in the isolated P(VAc-co-BGVE) copolymer ($x_{VAc}=1-x_{BGVE}$) versus $[VAc]_{feed}$ in the copolymerization feed for samples 1 through 5 (Table 2). The non-linear least squares fit of this data using the copolymerization equation yielded the reactivity ratios $r_{VAc}$ and $r_{BGVE}$ reported with 95% confidence interval uncertainties.

Example 14: Determination of Reactivity Ratios for the Copolymerization of VAc and BGVE In order to better control BAAVE comonomer incorporation into these copolymers, the reactivity ratios for the copolymerization of VAc and BGVE were determined. By conducting low monomer conversion copolymerizations at variable monomer feed ratios (samples P(VAc-co-BGVE) 1-5), the reactivity ratios $r_{VAc}$=0.82±0.07 and $r_{BGVE}$=1.61±0.12 were determined by non-linearly fitting the copolymerization equation (FIG. 4). These statistics reveal a slight preference for homopropagation of the BGVE monomer over its cross propagation against VAc. Without being held to theory, it is believed that this preference for homopropagation arises from monomer aggregation in solution by the formation of intermolecular hydrogen bonds between the Boc-amides in the monomer units. Similar trends in the copolymerization of acrylamides and acrylates have been ascribed to monomer aggregation by hydrogen-bonding, leading to entropically favored homopropagation.

Example 15: Representative Deprotection of P(VAc-co-BGVE) to poly(VAc-co-vinyl ammonium glycinate trifluoroacetate) (P(VAc-co-VGly.CF$_3$COOH))

(VAc-co-BGVE)-7 (100 mg, 0.13 mmol N-Boc groups) was dissolved in CF$_3$COOH (1.5 mL, 58.4 mmol). After stirring 30 min, excess CF$_3$COOH was removed by rotary evaporation and the resulting P(VAc-co-VGly.CF$_3$COOH) was purified by co-evaporation with MeOH (2×5 mL), followed by precipitation from MeOH (0.3 mL) into diethyl ether (150 mL). Solids were rendered solvent free by drying in vacuo at 22° C. $^1$H NMR (500 MHz, DMSO-d$_6$, 24° C.): δ 1.76 (4H; VAc and VGly.CF$_3$COOH backbone —CH$_2$), 1.94 (3H; VAc —CH$_3$), 3.75 (2H; VGly.CF$_3$COOH α-CH$_2$), 4.78 (2H; VAc and VGly.CF$_3$COOH backbone —CH), 8.33 (3H; VGly.CF$_3$COOH —NH$_3$). $^{13}$C NMR (500 MHz, DMSO-d$_6$, 24° C.): δ 20.8, 38.0, 38.4, 40.8, 66.7, 67.9, 117.1 (q, 1C), 158.4 (q, 1C), 167.2, 169.7

Example 16: N-Boc Deprotection of P(VAc-co-BVVE) to poly(VAc-co-vinyl ammonium valinate trifluoroacetate) (P(VAc-co-VVal.CF$_3$COOH))

This deprotection was carried out in a manner similar to that for P(VAc-co-BGVE). $^1$H NMR (500 MHz, DMSO-d$_6$, 24° C.): δ 0.99 (6H; VVal.CF$_3$COOH—CH(CH$_3$)$_2$, 1.75 (4H; VAc and VVal.CF$_3$COOH backbone —CH$_2$), 1.94 (3H; VAc —CH$_3$), 3.84 (1H; VVal.CF$_3$COOH NHCHC=O), 4.78 (2H; VAc and VVal.CF$_3$COOH backbone —CH), 8.39 (3H; VVal.CF$_3$COOH —NH$_3^+$).

Figure 5:
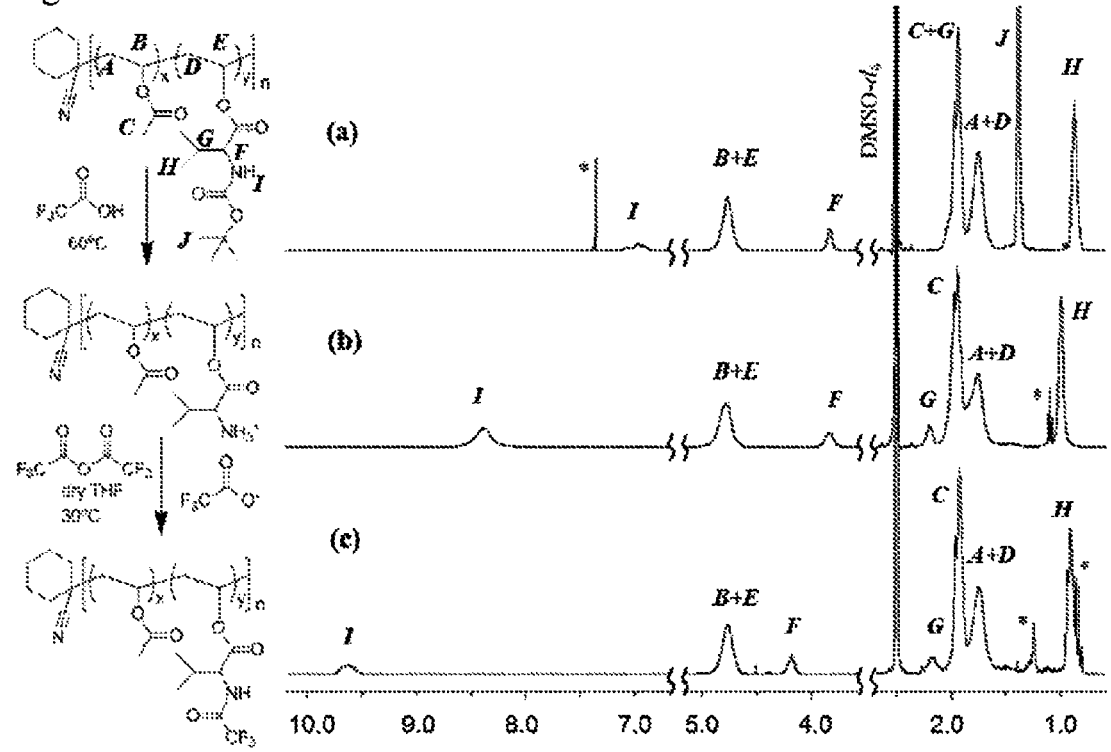
FIG. 5 (a) Poly(vinyl acetate-co-Boc-valine vinyl ester) (P(VAc-co-BVVE)-2) with [BVVE]=0.212 and $M_{n,total}$=26.5 kg/mol was deprotected with trifluoroacetic acid ($CF_3COOH$) to yield (b) poly(vinyl acetate-co-vinyl ammonium valinate trifluoroacetate) (P(VAc-co-VVal.$CF_3COOH$)-2) with [VVal.CF3COOH]=0.211. P(VAc-co-VVal.$CF_3COOH$)-2 was then trifluoroacetylated to yield (c) poly(vinyl acetate-co-vinyl trifluoroacetamidovalinate) (P(VAc-co-VTFAcVal)-2) with [VTFAcVa;]=0.217. The near invariance in valine vinyl ester monomer content across all three samples demonstrates that the valine and acetate side chains are not hydrolyzed in the initial $CF_3COOH$ deprotection step. Some solvent impurities remained in these polymers even after precipitation and extended vacuum drying, including (a) * $C_6H_6$, (b) * diethyl ether, and (c) * hexanes.

Selective and quantitative removal of the Boc-groups was achieved by stirring these polymers with CF$_3$COOH at 22° C., evidenced by the disappearance of resonances associated with the tert-butyl group in the $^1$H NMR spectra (FIGS. 5a and 5b).

Figure 6:
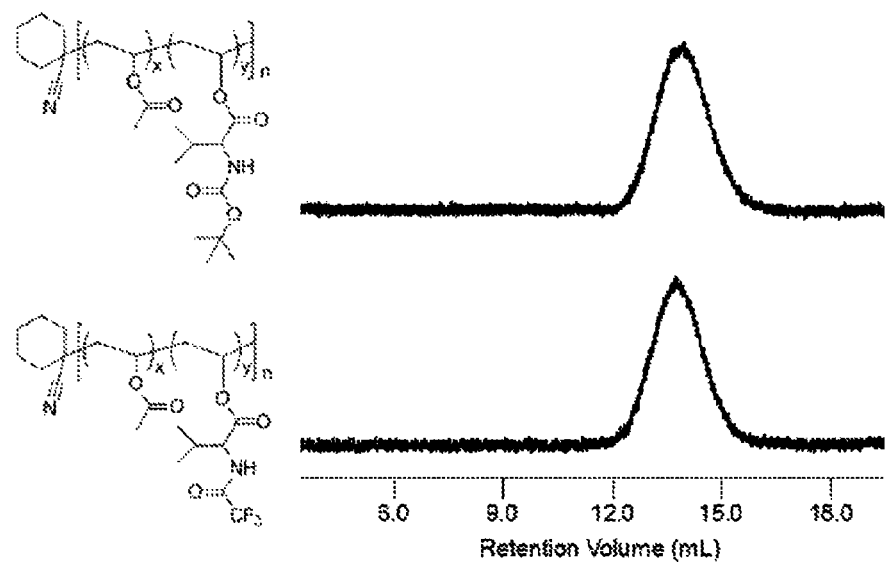
FIG. 6 shows SEC traces of poly(vinyl acetate-co-Boc valine vinyl ester) (P(VAc-co-BVVE)-2) and poly(vinyl acetate-co-vinyl trifluoroacetamidovalinate) (P(VAc-co-VTFAcVal)-2) using viscometric detection demonstrate preservation of a unimodal molecular weight distribution after $CF_3COOH$ Boc-deprotection and subsequent trifluoroacetylation.

Remarkably, the compositions of P(VAc-co-BVVE)-2 and P(VAc-co-VVal.CF$_3$COOH) calculated by quantitative $^1$H NMR were [VAc]: [BVVE]=3.71:1 before Boc-deprotection and [VAc]: [VVal.CF$_3$COOH]=3.73:1 after Boc-deprotection. This result indicates complete retention of the VAc functionalities under these reaction conditions. In order to rule out any possibility that the deprotection conditions harm the integrity of the polymer backbone or lead to unwanted crosslinking reactions, the isolated poly(VAc-co-AAVE. CF$_3$COOH) copolymers were trifluoroacetylated to render them soluble in THF[51] and their unimodal molecular weight distributions confirmed by SEC (see FIG. 5 and FIG. 6). The success of these conditions in deprotecting only the Boc-groups is polymer composition-independent, thus enabling access to a variety of polycations based on a relatively hydrophobic poly(vinyl acetate) backbone. It is noted that the water solubility of these VAc copolymers depends heavily on the incorporation of cationic functionalities, such that only polymers having [VAc]: [AAVE]<10:1 exhibit water solubility.

Example 17: Representative trifluoroacetylation of P(VAc-co-VGly.CF$_3$COOH) to poly(vinyl acetate-co-vinyl trifluoroacetamidoglycinate) (P(VAc-co-VTFAcGly))

P(VAc-co-VGly.CF$_3$COOH) (26.5 mg, 0.028 mmol —NH$_3^+$ groups) was treated with trifluoroacetic anhydride (0.5 mL, 3.5 mmol) under N$_2$(g) at 30° C. Anhydrous THF (3.0 mL) was added to the reaction after 2 hours, and the reaction was allowed to stir for an additional 24 hours. The resulting polymer was isolated by removal of solvent in vacuo. Trace amounts of trifluoroacetic anhydride were removed by co-evaporation with anhydrous THF (3×4 mL). The resulting polymer was precipitated from an anhydrous THF solution (0.3 mL) into stirring hexanes (100 mL), and the resulting solids were dried in vacuo at 22° C. $^1$H NMR (500 MHz, DMSO-d$_6$, 24° C.): 1.76 (4H; VAc and VTFAcGly backbone —CH$_2$), 1.94 (3H; VAc —CH$_3$), 3.94 (2H; VTFAcGly NHCH$_2$C=O), 4.78 (2H; VAc and VTFAcGly backbone —CH), 9.89 (1H; VTFAcGly CH$_2$NHC=O).

Example 18: Trifluoroacetylation of P(VAc-co-VVal.CF$_3$COOH) to poly(vinyl acetate-co-vinyl trifluoroacetamidovalinate) (P(VAc-co-VTFAcVal))

This trifluoroacetylation reaction was performed by analogy to the preparation given for P(VAc-co-VTFAcGly). $^1$H NMR (500 MHz, acetone-d$_6$, 24° C.): δ 0.91 (6H; VTFAcGly —CH(CH$_3$)$_2$), 1.75 (4H, VAc and VTFAcVal backbone —CH$_2$), 1.93 (3H; VAc —CH$_3$), 4.19 (1H, VTFAcVal NHCHC=O), 4.78 (2H, VAc and VTFAcVal backbone —CH), 9.63 (1H, VTFAcVal CHNHC=O).

Example 19: Representative hydrolysis/deprotection of P(VAc-co-BVVE) to poly(vinyl alcohol-co-vinyl valinate hydrochloride) (P(VA-co-VVal.HCl))

HCl (aq) (2.1 mL, 3.3 M) was added dropwise to P(VAc-co-BVVE) (201.2 mg, 1.87 mmol repeat unit) in MeOH (3.5 mL). After 6 days at 22° C., the mixture was concentrated in vacuo, redissolved in MeOH (1 mL), and precipitated into diethyl ether (200 mL). A solvent-free, white powdery solid was obtained upon freeze-drying from deionized H$_2$O at 22° C. $^1$H NMR (500 MHz, DMSO-d$_6$, 24° C.): δ 0.99 (6H, VVal.HCl —CH(CH$_3$)$_2$), 1.36 (2H; VA backbone —CH$_2$), 1.68 (2H; VVal.HCl backbone —CH$_2$), 2.21 (1H; VVal.HCl —CH(CH$_3$)$_2$), 3.82 (1H; VA backbone —CH), 3.89 (1H, VVal.HCl C=OCHNH$_3^+$), 4.29, 4.51, 4.69 (rr, mr, and mm stereochemical triads, 1H; VA-OH), 5.29 (1H; VVal.HCl backbone —CH), 8.50 (3H, VVal.HCl —NH$_3$). $^{13}$C NMR (500 MHz, DMSO-d$_6$, 24° C.): 17.8, 18.2, 29.2, 44.6, 45.2, 45.8, 46.1, 57.5, 63.6, 65.6, 67.7, 168.3.

Figure 7:
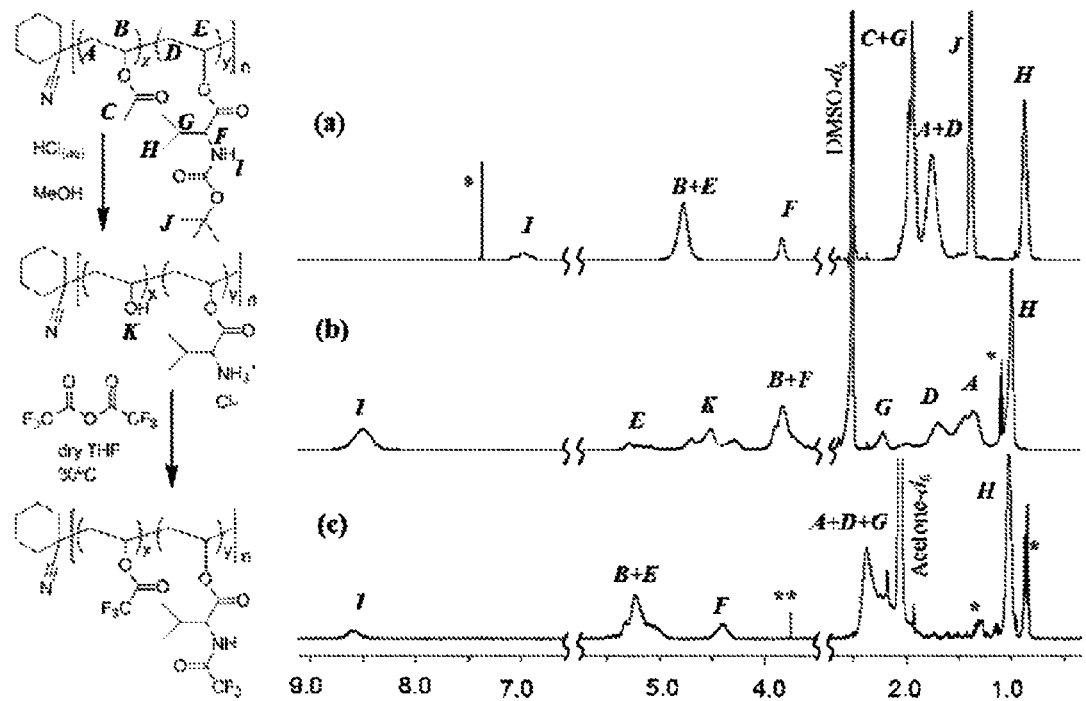
FIG. 7 (a) Poly(vinyl acetate-co-Boc-valine vinyl ester) (P(VAc-co-BVVE)-2) with [BVVE]=0.212 and $M_{n,total}$=26.5 kg/mol was globally deprotected with HCl(aq) to yield (b) poly(vinyl alcohol-co-vinyl valinate hydrochloride) (P(VA-co-VVal.HCl)-2). P(VA-co-VVal.HCl)-2 was trifluoroacetylated to form (c) poly(vinyl trifluoroacetate-co-vinyl trifluoroacetamidovalinate) (P(VTFAc-co-VTFAcVal)-2) with [VTFAcVal]=0.212. The nearly identical VVE comonomer contents of P(VAc-co-BVVE)-2 and P(VTFAc-co-VTFAcVal)-2 demonstrate that the valine side chains are not cleaved under the HCl(aq) deprotection conditions. Some impurities remained even after precipitation and extended vacuum drying, including (a) * $C_6H_6$, (b) * diethyl ether, (c) * hexanes, and ** an unknown impurity.
Figure 8:
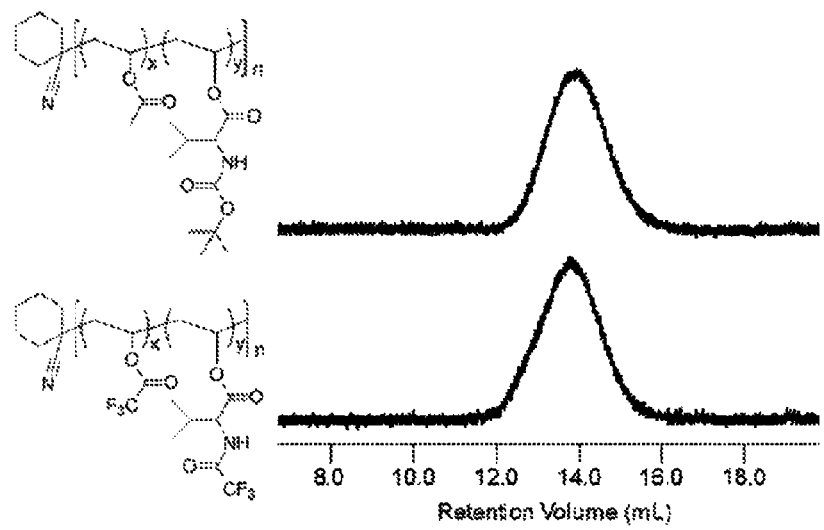
FIG. 8 shows SEC traces of poly(vinyl acetate-co-Boc valine vinyl ester) (P(VAc-co-BVVE)-2) and poly(vinyl trifluoroacetate-co-vinyl trifluoroacetamidovalinate) (P(VTFAc-co-VTFAcVal)-2) using viscometric detection demonstrate preservation of a unimodal molecular weight distribution after HCl(aq) deprotection/hydrolysis and subsequent trifluoroacetylation.

Polymer deprotection reactions conducted under anhydrous conditions using absolute MeOH and HCl(g) resulted in the isolation of colored polymers that exhibited $^1$H NMR resonances between 7.1-7.4 ppm in DMSO-d$_6$. Without being held to theory, the color of these materials and these $^1$H NMR resonances are attributed to the dehydration of the polyhydroxylated PVA backbone to form π-conjugated functionalities. Deprotecting these polymers in the presence of water ([H$_2$O]: [PVA hydroxyl groups]>50:1) prevents these dehydration and crosslinking reactions. As shown in FIG. 7, deprotection of P(VAc-co-BVVE)-2 with aqueous HCl yielded P(VA-co-VVE.HCl) as a white, powdery solid free of colored impurities. Due to the overlap of diagnostic $^1$H NMR resonances in DMSO-d$_6$, we were unable to directly analyze the compositions of these hydrophilic polymers to determine whether or not the amino acid side chains remained intact. Consequently, we trifluoroacetylated these polymers using trifluoroacetic anhydride according to a previously reported procedure. Quantitative $^1$H NMR composition analysis of the trifluoroacetylated poly(VTFAc-co-VTFAcVal) in acetone-$d_6$ (FIG. 7) conclusively demonstrates that the composition of this polymer matched that of the parent poly(VAc-co-BVVE)-2. SEC analysis of the THF-soluble trifluoroacetylated poly(VTFAc-co-VTFAcVal) shows that these polymers are unimodal, demonstrating that the HCl(aq) deprotection conditions do not cause chain scission reactions (see FIG. 8). Surprisingly, we observe negligible acid-catalyzed hydrolysis of the protonated valine side chains of this hydrophilic polymer during the initial deprotection reaction. We attribute the remarkable stability of these polymer side chain ester functionalities under the acidic reaction conditions to the protonation of the a-amino group, which electrostatically blocks the protonation of the ester carbonyl required for acid-catalyzed ester hydrolysis.

Example 20: Trifluoroacetylation of P(VA-co-VVal-.HCl) to poly(vinyl trifluoroacetate-co-vinyl trifluoroacetamidovalinate) (P(VTFAc-co-VTFAcVal))

P(VA-co-VVal.HCl) (50.7 mg, 0.69 mmol monomer) was treated with trifluoroacetic anhydride (2.4 mL, 0.017 mol) while stirring under nitrogen atmosphere at 30° C. Anhydrous THF (4.5 mL) was added to the reaction after 2 hours to ensure complete reaction of the hydroxyl and protonated amino acid groups. After 24 hours, the resulting polymer was isolated by removal of solvent in vacuo. Trace amounts of trifluoroacetic anhydride were removed by co-evaporation with anhydrous THF (3×5 mL). The polymer was precipitated out of anhydrous THF (0.3 mL) into stirring hexanes and dried in vacuo at room temperature. $^1$H NMR (500 MHz, acetone-$d_6$, 24° C.): δ 1.02 (6H, VTFAcVal —CH(CH$_3$)$_2$), 2.17 (1H; VTFAcVal —CH(CH$_3$)$_2$), 2.37 (4H; VTFAc and VTFAcVal backbone —CH$_2$), 4.39 (1H; VTFAcVal C=OCHNH), 5.23 (2H; VTFAc and VTFAcVal backbone —CH), 8.60 (1H; VTFAcVal NH).

Example 21: MTT Assay to Determine Cell Viability in the Presence of a Polymer

The effect of a polymer as described herein on cell viability can be assessed using an MTT (3-(4,5-dimethylthiazol-2-yl)-2,5-diphenyl tetrazolium bromide) assay. Cells such as L929 cells can be seeded into a 96-well plate at a density of about 8000 cells/well, for example. After about a 24 hour period, the cell culture medium is replaced with serial dilutions of polymer solutions in antibiotic-free medium such as DMEM (Dulbecco's modified Eagle's medium). After about a 24 hour incubation, 20 μL MTT is added. After an incubation time of about 4 hours, unreacted DTT is removed by aspiration and the product is dissolved with 200 μL/well of dimethylsulfoxide and quantitating the product with a plate reader at 570 and 690 nm. Relative cell viability in % is calculated from the test/control X 100. Tin-stabilized poly(vinyl chloride) and polyethylene (PE) are used as a positive and negative control, respectively. PEI and PVA are also used as a positive and a negative control. The IC$_{50}$ is calculated as the polymer concentration which inhibits the growth of 50% of the cells relative to nontreated cells.

Example 22: LDH Assay to Quantify Polymer-Cell Interactions

Polymer-cell interactions are quantified by the release of LDH (lactate dehydrogenase), a cystosolic enzyme, because polycations are expected to interact with negatively charged cell membranes through electrostatic interactions. Membrane damage resulting in necrotic cell death is measured using an LDH assay. Commercially available LDH assay kits include CytoTox-ONE™ from Promega. For example, L292 cells are seeded into 96-well plates at a density of about 12000 cells/well. After about 24 hours, the culture medium is replaced with 100 μL/well of serial dilution of polymer stock solution in antibiotic-free medium such as DMEM. After an incubation period of about 6 hours, LDH activity is measured in cell culture supernatants using a spectrofluorometer with 560 nm excitation and 600 nm emission wavelengths. Results can be presented as maximum LDH release determined by complete lysis of cells.

Example 23: Caspase 3/7 Activity Assay to Measure Apoptotic Cell Reactions

Apotoctic activity can be measured using apo-ONE[198] caspase 3/7-assay by Promega. For example, L292 cells are seeded into 96-well plates at a density of about 12000 cells/well. After about 24 hours, the culture medium is replaced with 100 μL/well of serial dilution of polymer stock solution in antibiotic-free medium such as DMEM.

After an incubation period of about 6 hours, the cells are lysed, and caspase 3/7 activity is measured by cleavage of the caspase 3/7 substrate rhodamine 110 (bis-(N-benzyloxycarbonyl-L-aspartyl-L-glutamyl-Lvalyl-L-aspartic acid amide)))Z-DEVD R-110). Samples are measured with a spectrofluorimeter at 499 nm excitation and 521 nm emission. Results can be presented as relative fluorescence units in comparison to untreated control cells.

Example 24: Direct Contact Assay

A direct contact assay includes the determination of mouse fibroblast proliferation and morphology on direct contact with surfaces coated with a polymer. Polymer solution can be spin-coated onto glass coverslips. After drying, the glass coverslips can be treated with isopropanol for disinfection, then incubated with serum supplemented with cell culture medium. Mouse L929 fibroblasts can be seeded at a density of 35,000 cells/well and observed. Cell proliferation and morphology can be compared qualitatively to cells cultured on uncoated glass coverslips.

Example 25: Transfection Experiments

Polymers as described herein are mixed with fixed ratios of DNA-luc (luciferase-labeled DNA) in NaCl or buffered solution. NIH/3T3 mouse fibroblasts or other cultured cells are seeded onto multi-well plates. After 24 hours, medium is exchanged for polymer-DNA solution. After 4 hours, the medium is changed and after 44 hours of growth, the cells are washed and lysed. 20 μL of lysis medium is mixed with 100 pt of luciferase assay medium (Promega) and luciferase activity measured. Luciferase activity can also be measured by confocal microscopy.

New degradable polyelectrolytes have been synthesized by post-polymerization modification of protected random copolymers containing VAc and BAAVE monomers of glycine, valine, alanine, and proline. BAAVE monomers were synthesized by an optimized Pd-catalyzed transvinylation of a Boc-protected amino acid with either vinyl acetate or vinyl pivalate, and their free radical homopolymerization (and copolymerization with VAc) produced unimodal polymers. Modestly hydrophobic polycations of the form P(VAc-co-AAVE.CF$_3$COOH) were synthesized by Boc-deprotection of the polymer amino acid residues using CF$_3$COOH. Alternative deprotection conditions utilizing HCl(aq) simultaneously hydrolyze both the acetate esters and the Boc-protecting groups of the amino acid side chains, thus producing hydrophilic polycations of the form P(VA-co-AAVE.HCl). These potentially degradable polyelectrolytes are highly tailorable in both their backbone charge density as well as their hydrophilicity, which bodes well for their potential utility in a variety of applications. Preliminary studies suggest that controlled/living polymerization of BAAVE monomers by reversible-addition fragmentation chain transfer (RAFT) polymerization may allow the incorporation of these cationic functionalities into block copolymers, thus broadening the scope of utility of this versatile degradable polyelectrolyte system by enabling the synthesis of narrow dispersity copolymers as well as block copolymers and other polymer chain architectures.

The following abbreviations are used herein: N-(tert-butoxycarboxyl)amino acid O-vinyl esters (BAAVE) monomers derived from glycine (BGVE), valine (BVVE), alanine (BAVE), and proline (BPVE). Free radical copolymerization of these monomers with VAc yields poly(vinyl acetate-co-BAAVE) (P(VAc-co-BAAVE)), which may be differentially deprotected to yield either cationic poly(vinyl acetate-co-AAVE.CF$_3$COOH) P(VAc-co-AAVE.CF$_3$COOH) or cationic poly(vinyl alcohol-co-AAVE.HCl) P(VA-co-AAVE.HCl) with controlled backbone charge densities.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An "amino acid" as used herein encompasses natural and synthetic amino acids containing a terminal carboxyl group and a terminal amino group, wherein the carboxyl group and the amino group are separated by one, two, or three carbon atoms, each of which may be optionally substituted.

An "alkyl" group is a straight or branched chain saturated aliphatic hydrocarbyl group having the specified number of carbon atoms, a valence of one, and optionally substituted with one or more substituents where indicated.

A "haloalkyl" group is an alkyl group as defined above, substituted with one or more halogen atoms, generally up to the maximum allowable number of halogen atoms. Non-limiting examples include trifluoromethyl, difluoromethyl, 2-fluoroethyl, and penta-fluoroethyl.

An "alkenyl" group is a straight or branched chain hydrocarbyl group having the specified number of carbon atoms, a valence of one, at least one carbon-carbon double bond, and optionally substituted with one or more substituents where indicated.

An "alkynyl" group is a straight or branched chain hydrocarbon having the specified number of carbon atoms a valence of one, at least one carbon-carbon triple bond, and optionally substituted with one or more substituents where indicated.

A "cycloalkyl" group is a hydrocarbyl group having one or more saturated rings in which all ring members are carbon, the specified number of carbon atoms, a valence of one, and optionally substituted with one or more substituents where indicated. Non-limiting examples include cyclopropyl, cyclobutyl, cyclopentyl, cyclohexyl, cycloheptyl, cyclooctyl, and adamantly groups. Cycloalkyl groups do not contain an aromatic ring or a heterocyclic ring.

An "aryl" group is a carbocyclic ring system that includes one or more aromatic rings in which all ring members are carbon, having the specified number of carbon atoms, a valence of one, and optionally substituted with one or more substituents where indicated and having. More than one ring may be present, and any additional rings may be independently aromatic, saturated, or partially unsaturated and multiple rings, if present, may be fused, pendent, spirocyclic or a combination thereof. Non-limiting examples include phenyl, naphthyl, and tetrahydronaphthyl groups. "Phenyl" means a six-membered aromatic ring."

As used herein, the term (meth)acrylate includes acrylate and methacrylate.

As used herein, when a definition is not otherwise provided, the prefix "hetero" means that the group has 1 to 3 heteroatoms independently selected from N, O, S, P, and a combination thereof. In cyclic groups, the 1 to 3 heteroatoms can be present as a ring member. For example, a pyridyl is C5 heteroaryl group, and an "alkoxy" group is a heteroalkyl group where an alkyl moiety is linked via an oxygen (e.g., methoxy).

As used herein, when a definition is not otherwise provided, "substituted" indicates replacement of one or more hydrogen atoms of a group with a substituent selected from a $C_1$ to $C_6$ alkyl group, a $C_1$ to $C_6$ hydroxyalkyl group, a $C_2$ to $C_6$ alkenyl group, a $C_2$ to $C_{30}$ alkynyl group, a $C_6$ to $C_{30}$ aryl group, a $C_1$ to $C_6$ heteroalkyl group, a $C_3$ to $C_{30}$ cycloalkyl group, a $C_3$ to $C_{15}$ cycloalkenyl group, a $C_6$ to $C_{30}$ cycloalkynyl group, a $C_2$ to $C_{30}$ heterocycloalkyl group, halogen (Br, F or Cl,), a haloalkyl group, an alkoxy group, a nitro group (—NO$_2$), a cyano group (—CN), an amino group (—NR'''$_2$ wherein each R''' is independently a hydrogen or a $C_1$ to $C_6$ alkyl group, a $C_2$ to $C_6$ alkynyl group, or a $C_6$ to $C_{30}$ aryl group), a carbonyl group (—C(=O)—), a carbamyl group, an ester group (—C(=O)OR" wherein R" is a $C_1$ to $C_6$ alkyl group or a $C_6$ to $C_{10}$ aryl group), a carboxyl group (—C(=O)OH) or a salt thereof, and a combination thereof.

While the stereochemistry of the various compounds is not explicitly shown, it is to be understood that this disclosure encompasses all isomers.

When referring to the molecular weight of a polymer, the term molecular weight refers to number-averaged molecular weight ($M_n$).

Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

The invention claimed is:

1. A copolymer consisting of units of the formula

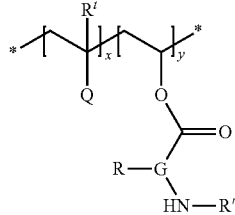

and salts thereof, wherein
$R^t$ is H, halo, or methyl,
Q is cyano, halo, nitro, OH, —$CR^a$=$CR^bR^c$, —C(O)$NR^dR^e$, carbonyl($C_1$-$C_{12}$)alkyl, substituted or unsubstituted $C_6$-$C_{12}$ aryl, N-caprolactam, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_1$-$C_{18}$ alkyl,
x+y is an integer greater than two,
R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl;
R' is a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, wherein substituted for R' comprises replacement of one or more hydrogen atoms of a group with a substituent selected from a $C_1$ to $C_6$ alkyl group; a $C_1$ to $C_6$ hydroxyalkyl group; a $C_2$ to $C_6$ alkenyl group; a $C_2$ to $C_{30}$ alkynyl group; a $C_6$ to $C_{30}$ aryl group; a $C_1$ to $C_6$ heteroalkyl group; a $C_3$ to $C_{30}$ cycloalkyl group; a $C_3$ to $C_{15}$ cycloalkenyl group; a $C_6$ to $C_{30}$ cycloalkynyl group; a $C_2$ to $C_{30}$ heterocycloalkyl group; halogen; a haloalkyl group; an alkoxy group; —$NO_2$; —CN; —$NR'''_2$ wherein each R''' is independently a hydrogen or a $C_1$ to $C_6$ alkyl group, a $C_2$ to $C_6$ alkynyl group, or a $C_6$ to $C_{30}$ aryl group; a carbamyl group; —C(=O)OR" wherein R" is a $C_1$ to $C_6$ alkyl group or a $C_6$ to $C_{10}$ aryl group; or —C(=O)OH; and
G is a group of the formula

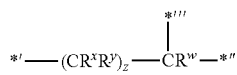

wherein
one of *' and *'' indicates a point of attachment to the carbonyl and the other indicates a point of attachment to N, and *''' indicates a point of attachment to R,
z is 0, 1, or 2, and
$R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

2. A copolymer consisting of units of the formula

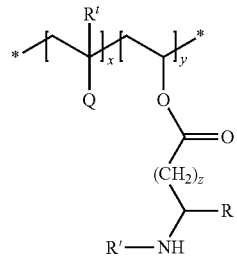

and salts thereof, wherein
$R^t$ is H, halo, or methyl,
Q is cyano, halo, nitro, OH, —$CR^a$=$CR^bR^c$, —C(O)$NR^dR^e$, carbonyl($C_1$-$C_{12}$)alkyl, carbonyloxy($C_1$-$C_{12}$)alkyl, substituted or unsubstituted $C_6$-$C_{12}$ aryl, N-caprolactam, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_2$-$C_{18}$ alkyl, carbonyl($C_1$-$C_{12}$)alkyl, x+y is an integer greater than two, z is 0, 1, or 2, and R' together with R forms a substituted or unsubstituted $C_2$-$C_{18}$ heterocycloalkyl, or substituted or unsubstituted $C_2$-$C_{18}$ heteroaryl group, each having 5 to 8 ring members.

3. The copolymer of claim 2, wherein R and R' together form propylene to provide a monomer having a 5-membered ring.

4. The copolymer of claim 2, wherein Q is carbonyl($C_1$-$C_{12}$)alkyl, carbonyloxy($C_1$-$C_{12}$)alkyl, substituted or unsubstituted $C_6$-$C_{12}$ aryl, N-caprolactam, or a combination comprising at least one of the foregoing groups.

5. A copolymer consisting of units of the formula

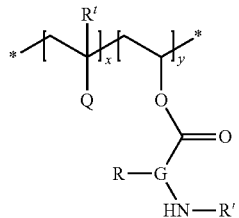

and salts thereof, wherein $R^t$ is halo,

Q is cyano, halo, nitro, OH, $-CR^a=CR^bR^c$, $-C(O)NR^dR^e$, carbonyl($C_1$-$C_{12}$)alkyl, carbonyloxy($C_1$-$C_{12}$)alkyl-substituted or unsubstituted $C_6$-$C_{12}$ aryl, N-caprolactam, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_1$-$C_{18}$ alkyl, x+y is an integer greater than two, R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl;

R' is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, wherein substituted for R' comprises replacement of one or more hydrogen atoms of a group with a substituent selected from a $C_1$ to $C_6$ alkyl group; a $C_1$ to $C_6$ hydroxyalkyl group; a $C_2$ to $C_6$ alkenyl group; a $C_2$ to $C_{30}$ alkynyl group; a $C_6$ to $C_{30}$ aryl group; a $C_1$ to $C_6$ heteroalkyl group; a $C_3$ to $C_{30}$ cycloalkyl group; a $C_3$ to $C_{15}$ cycloalkenyl group; a $C_6$ to $C_{30}$ cycloalkynyl group; a $C_2$ to $C_{30}$ heterocycloalkyl group; halogen; a haloalkyl group; an alkoxy group; $-NO_2$; $-CN$; $-NR'''_2$ wherein each R''' is independently a hydrogen or a $C_1$ to $C_6$ alkyl group, a $C_2$ to $C_6$ alkynyl group, or a $C_6$ to $C_{30}$ aryl group; a carbamyl group; $-C(=O)OR''$ wherein R'' is a $C_1$ to $C_6$ alkyl group or a $C_6$ to $C_{10}$ aryl group; or $-C(=O)OH$; and G is a group of the formula

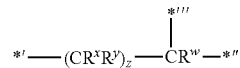

wherein one of *' and *'' indicates a point of attachment to the carbonyl and the other indicates a point of attachment to N, and *''' indicates a point of attachment to R, z is 0, 1, or 2, and $R^w$ $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

6. A copolymer consisting of units of the formula

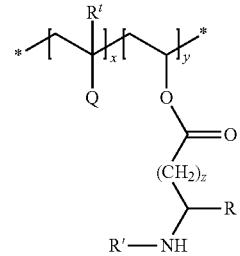

and salts thereof, wherein $R^t$ is halo,

Q is cyano, halo, nitro, OH, $-CR^a=CR^bR^c$, $-C(O)NR^dR^e$, carbonyl($C_1$-$C_{12}$)alkyl, carbonyloxy($C_1$-$C_{12}$)alkyl, substituted or unsubstituted $C_6$-$C_{12}$ aryl, N-caprolactam, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_1$-$C_{18}$ alkyl, carbonyl($C_1$-$C_{12}$)alkyl, x+y is an integer greater than two, z is 0, 1, or 2, and R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, R' is H or R' together with R forms a substituted or unsubstituted $C_2$-$C_{18}$ heterocycloalkyl, or substituted or unsubstituted $C_2$-$C_{18}$ heteroaryl group, each having 5 to 8 ring members.

7. The copolymer of claim 6, wherein R is H, methyl, ethyl, propyl, isopropyl, butyl, isobutyl, sec-butyl, methylthiomethylene, benzyl, indolylmethylene, or R and R' together form propylene to provide a monomer having a 5-membered ring.

8. The copolymer of claim 6, wherein Q is carbonyl($C_1$-$C_{12}$)alkyl, carbonyloxy($C_1$-$C_{12}$)alkyl, substituted or unsubstituted $C_6$-$C_{12}$ aryl, N-caprolactam, or a combination comprising at least one of the foregoing groups.

9. A copolymer consisting of units of the formula

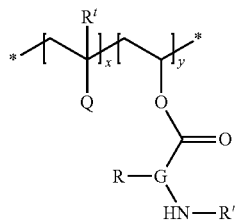

and salts thereof, wherein $R^t$ is H, halo, or methyl,

Q is cyano, halo, nitro, OH, —$CR^a$=$CR^bR^c$, —C(O)$NR^dR^e$, carbonyl($C_1$-$C_{12}$)alkyl, substituted or unsubstituted $C_6$-$C_{12}$ aryl, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_1$-$C_{18}$ alkyl, x+y is an integer greater than two, R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl;

R' is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, wherein substituted for R' comprises replacement of one or more hydrogen atoms of a group with a substituent selected from a $C_1$ to $C_6$ alkyl group; a $C_1$ to $C_6$ hydroxyalkyl group; a $C_2$ to $C_6$ alkenyl group; a $C_2$ to $C_{30}$ alkynyl group; a $C_6$ to $C_{30}$ aryl group; a $C_1$ to $C_6$ heteroalkyl group; a $C_3$ to $C_{30}$ cycloalkyl group; a $C_3$ to $C_{15}$ cycloalkenyl group; a $C_6$ to $C_{30}$ cycloalkynyl group; a $C_2$ to $C_{30}$ heterocycloalkyl group; halogen; a haloalkyl group; an alkoxy group; —$NO_2$; —CN)' $NR'''_2$ wherein each R''' is independently a hydrogen or a $C_1$ to $C_6$ alkyl group, a $C_2$ to $C_6$ alkynyl group, or a $C_6$ to $C_{30}$ aryl group; a carbamyl group; —C(=O)OR'' wherein R'' is a $C_1$ to $C_6$ alkyl group or a $C_6$ to $C_{10}$ aryl group; or —C(=O)OH; and G is a group of the formula

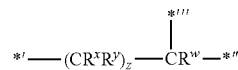

wherein one of *' and *" indicates a point of attachment to the carbonyl and the other indicates a point of attachment to N, and *''' indicates a point of attachment to R, z is 0, 1, or 2, and $R^w$, $R^x$ and $R^y$ are each independently H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$ to $C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$ to $C_{18}$ aryl, a substituted or unsubstituted $C_7$ to $C_{18}$ arylalkylene, or a substituted or unsubstituted $C_4$-$C_{18}$ heteroaryl, or any two of R, R', $R^w$, $R^x$, and $R^y$ together form a substituted or unsubstituted $C_5$-$C_{18}$ cycloalkyl, substituted or unsubstituted $C_2$-$C_{18}$ heterocycloalkyl, or substituted or unsubstituted $C_2$-$C_{18}$ heteroaryl group, each having 5 to 8 ring members.

10. A copolymer consisting of units of the formula

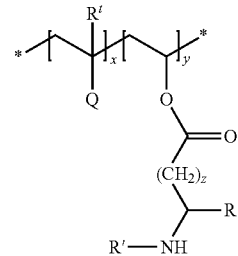

and salts thereof, wherein $R^t$ is H, halo, or methyl,

Q is cyano, halo, nitro, OH, —$CR^a$=$CR^bR^c$, —C(O)$NR^dR^e$, carbonyl($C_1$-$C_{12}$)alkyl, substituted or unsubstituted $C_6$-$C_{12}$ aryl, or a combination comprising at least one of the foregoing groups, wherein each $R^a$, $R^b$, and $R^c$ are independently H or $C_1$-$C_{18}$ alkyl, and wherein each $R^d$ and $R^e$ are independently H or $C_1$-$C_{18}$ alkyl, carbonyl($C_1$-$C_{12}$)alkyl, x+y is an integer greater than two, z is 0, 1, or 2, and R is H, a substituted or unsubstituted $C_1$-$C_{18}$ alkyl, a substituted or unsubstituted $C_2$-$C_{18}$ alkenyl, a substituted or unsubstituted $C_2$-$C_{18}$ alkynyl, a substituted or unsubstituted $C_3$-$C_{18}$ cycloalkyl, a substituted or unsubstituted $C_1$-$C_{18}$ haloalkyl, a substituted or unsubstituted $C_2$-$C_{18}$ heterocycloalkyl, a substituted or unsubstituted $C_6$-$C_{18}$ aryl, a substituted or unsubstituted $C_7$-$C_{18}$ arylalkylene, or a substituted or unsubstituted $C_3$-$C_{18}$ heteroaryl, R' is H or R' together with R forms a substituted or unsubstituted $C_2$-$C_{18}$ heterocycloalkyl, or substituted or unsubstituted $C_2$-$C_{18}$ heteroaryl group, each having 5 to 8 ring members.

11. The copolymer of claim 10, wherein R is H, methyl, ethyl, propyl, isopropyl, butyl, isobutyl, sec-butyl, methylthiomethylene, benzyl, indolylmethylene, or R and R' together form propylene to provide a monomer having a 5-membered ring.

12. The copolymer of claim 10, wherein Q is carbonyl ($C_1$-$C_{12}$)alkyl, substituted or unsubstituted $C_6$-$C_{12}$ aryl, or a combination comprising at least one of the foregoing groups.

* * * * *